United States Patent [19]
Nashiki

[11] Patent Number: 6,081,083
[45] Date of Patent: Jun. 27, 2000

[54] SWITCHED RELUCTANCE MOTOR

[75] Inventor: Masayuki Nashiki, Niwa-gun, Japan

[73] Assignee: Okuma Corporation, Nagoya, Japan

[21] Appl. No.: 09/168,954

[22] Filed: Oct. 9, 1998

[30] Foreign Application Priority Data

Oct. 24, 1997 [JP] Japan ..................................... 9-292324
Jun. 2, 1998 [JP] Japan ................................... 10-152809

[51] Int. Cl.[7] .................................................. H02K 23/00
[52] U.S. Cl. .......................... 318/254; 318/138; 318/439; 318/701; 318/802; 318/805; 318/807; 318/766; 318/432
[58] Field of Search ...................................... 318/254, 138, 318/439, 701, 802, 805, 807, 766, 432

[56] References Cited

U.S. PATENT DOCUMENTS 4,277,735  7/1981  Okuyama et al. ....................... 318/766
4,933,621  6/1990  MacMinn et al. ...................... 318/696

*Primary Examiner*—Karen Masih
*Attorney, Agent, or Firm*—Oliff & Berridge, PLC

[57] ABSTRACT

In a switched reluctance motor and control system for such a motor, a rotor comprises four salient poles each having a width of about 50-degrees, and a stator has six salient poles each having a width of about 30-degrees. One Excitation winding is mounted around each stator salient pole and these are connected in series. An excitation drive circuit supplies a dc excitation current to each excitation winding to excite the motor in accordance with an excitation command signal. A torque-current drive circuit renders a current, whose magnitude in accordance with a torque command, to flow into torque windings mounted one round on each of the six stator salient poles successively according to the angle of rotation of the rotor.

8 Claims, 24 Drawing Sheets

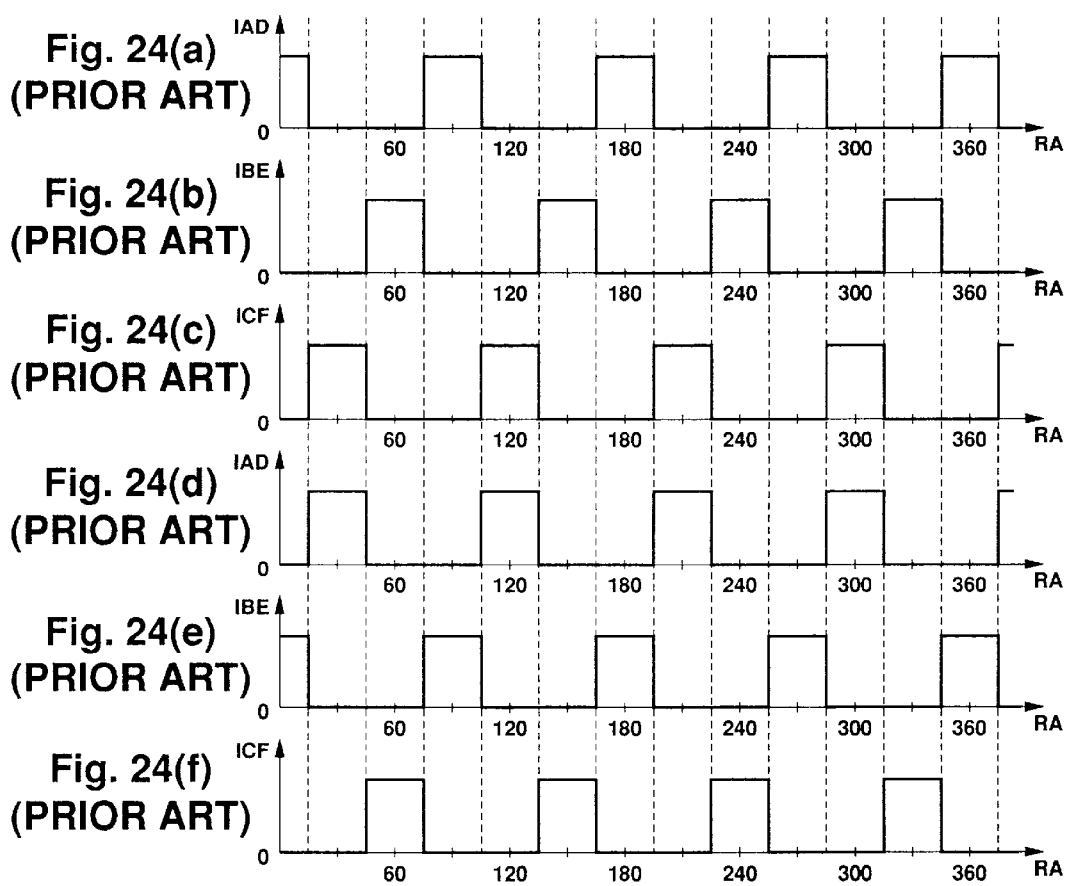

6,081,083

SWITCHED RELUCTANCE MOTOR

BACKGROUND OF THE INVENTION

1. Field of the Invention

The present invention relates to a switched reluctance motor, and more particularly to a low cost switched reluctance motor which can be used as a general-purpose industrial motor. The invention relates also to such a motor which is useful as a high-speed motor in which a centrifugal force is a problem in view of a rotor's strength rather than a rotor is solid.

2. Description of the Related Art

In order to rotate the high-speed-rotation shaft of a machine tool in, for example, a machining center, a motor requires approximately 100 mm diameter rotor and at least 30,000 rpm.

In the described use, it has currently been common to employ an induction motor. In order to resist to the centrifugal force, the rotor slot is often kept closed and also the coil ends of the rotor are often reinforced.

However, these conventional systems are expensive and inevitably adopt the second best reinforced structure with some sacrifice of the motor characteristics.

Attempts have been made to improve the structures of such conventional reinforced motors. To this end, studies on switched reluctance motors relating to their possibilities for increased rotor strength are common with some of the resulting ideas being put into practice.

A typical example of these conventional switched reluctance motors is shown in FIG. 23 of the accompanying drawings. A drive algorithm for the motor is shown in FIG. 24. A rotor 2 is in the form of a simple laminate body composed of a plurality of axially arranged silicon steel disks. Because of the increased strength of the rotor 2, this conventional motor meets one handle for high-speed rotation.

A stator 1 of the motor of FIG. 23 has six salient poles 20 each having a width of approximately 30 degrees in terms of angle of rotation of the rotor. Six windings are mounted one round each stator salient pole 20. The rotor 2 has four salient poles 21 each having a width of approximately 30 degrees in terms of rotor's rotational angle.

In operation, for generating a counterclockwise rotational torque in FIG. 23, currents are supplied to flow in the windings indicated by TC1, TC2 and TF1, TF2 to attract the rotor salient poles. At that point, the currents to flow in the windings TC1, TC2 and those to flow in the windings TF1, TF2 are opposite in direction in such a manner that prospective magnetic fluxes pass through the rotor 2. Further, when the rotor salient poles have reached the stator salient poles associated with the windings TC1, TC2 as the rotor 2 is rotated counterclockwise, generation of the rotational torque will then terminate. At that point, those counterclockwise next to these rotor salient poles approach the stator salient poles associated with the windings indicated by TE1 TE2; if no current is supplied to flow in the windings TC1, TC2 and the currents are supplied to flow in the windings indicated by TE1, TE2 and TB1, TB2, then a counterclockwise rotational torque will be generated. Thus if suitable successive currents are supplied to flow in the individual stator windings one after another, successive rotational torques will be generated.

Likewise, for generating a clockwise rotational torque in FIG. 23, currents are supplied to flow in the windings indicated by TB1, TB2 to attract the rotor salient poles.

Variation of the torque to be generated depends on the current of each winding and the relative position of the stator and rotor, but does not in principle depend on the speed of rotation of the rotor.

A practical example of a power amplifier section of the drive system for the switched reluctance motor of FIG. 23 will be described with reference to FIG. 5 which shows the common circuit to be used in the present invention. A winding E corresponds to the windings TA1, TA2 of FIG. 23 and a winding WD corresponds to the windings TD1, TD2 of FIG. 23; these two windings WA, WD are opposite to each other in turning. The current IAD to flow in the winding WA, WD is controlled accurately with respect to the current command value by PWM control using the difference between a current command and the detected value of the current IAD like the very ordinary, non-illustratedmotor-current control. In a microscopic operation, a voltage is applied to the windings WA, WD by rendering transistors 8, 9 to assume the ON state, so the current IAD will be increased. If the transistors 8, 9 are rendered to assume the OFF state, magnetic energy and dynamic energy caused by the flowing current at that time are supplied back to DC power sources VS, VL via diodes 10, 11 to gradually reduce the current. As the foregoing operation is repeated, the average current of the currents IAD with respect to the current command value can be controlled. The current control for the remaining two phases is controlled in the same manner.

Of symbols used in FIGS. 5 and 23 to designate the windings and currents, alphabetical characters A, B, C, D, E, F indicate the individual stator magnetic poles of the motor.

The drive algorithm for the switched reluctance motor of FIG. 23 is shown in FIG. 24. The horizontal axis RA is the angular position of the rotor in FIG. 23. For generating a counterclockwise torque, the currents having the characteristics of FIGS. 24(a), 24(b), and 24(c) are supplied to flow in the associated windings. For generating a clockwise torque, the currents having characteristics of FIGS. 24(d), 24(e), and 24(f) are supplied to flow in the associated windings. In either case a larger current amplitude will result in a larger torque.

Advantages of conventional switched reluctance motors include: (1) the manufacturing cost is low because the motor structure is simple and, particularly, the structure of the stator windings is simple; (2) the entire length of the motor is relatively short because the coil ends of the stator windings can be shortened; (3) high-speed rotation can be realized in a physical manner because the rotor has sufficient strength; and (4) the drive circuit can be simplified because the drive algorithm is simple so that only one-way flow of the current is needed.

However, certain disadvantages accompany such conventional motors. For example, a control algorithm is needed to smooth the relationship between the electric energy supplied and the magnetic energy accumulated inside the motor and the mechanical output energy to eliminate large torque ripples. In an effort to solve this problem, a current control method has been proposed in which the current is compensated so as to compensate torque ripples and the compensated current is then supplied to flow in the associated winding. However, this proposed current control method creates additional problems. Further, the intermittent torque generated by the individual stator salient pole would, along with the torque ripples, contribute to stator deformation, thus increasing vibration and noise while the motor is driven. As can be seen from the characteristics of FIGS. 24(a) through 24(f), it is in fact possible for a torque opposite to that desired to be generated.

For high-speed rotation, a very-high-speed current switch is essential. Also, as supply and regeneration of the magnetic energy inside the motor must be carried out frequently, only a limited power factor can be achieved.

SUMMARY OF THE INVENTION

It is therefore an object of the present invention to provide an improved switched reluctance motor and an improved control system which solves the above described problems.

As a general advantageous feature, the improved motor experiences less torque ripple from a basic algorithm view point because torques to be generated on the individual rotor salient poles can be continuous for the rotor axis.

In a specific motor structure of the present invention, as shown in FIG. 1, excitation windings independent of torque windings are mounted one round for each stator salient pole and excitation currents are supplied to flow in the corresponding excitation windings of all of the stator salient poles as shown in FIG. 4.

Alternatively, the excitation windings may be omitted from the individual stator salient poles, and instead, one permanent magnet may be arranged at each stator salient poles as shown in FIG. 9.

As shown in FIGS. 1 and 2, the width of the stator salient poles is approximately 30 degrees, and the number of stator salient poles is 6. And the width of rotor salient poles is 40 degrees with a 5-degree structural skew, and the number of the rotor salient poles is 4.

The reluctance motor may be equipped with a torque-current control section for controlling a torque current to flowing in each torque winding of the stator.

The excitation windings may be omitted, and the torque winding may have a torque-current control section for superposing the excitation current over the torque winding.

Two sets of windings are mounted round each stator salient pole, and transistors are rendered to assume the ON state to supply voltage and current to one set of stator windings to increase the current. To decrease the current, the transistor is rendered to assume the OFF state to supply energy back to the power sources via a diode by the voltage induced by the other set of stator windings, which are electromagnetically coupled, thus decreasing the total stator current of that stator.

As a measure to minimize torque ripples, the rotor or stator is axially divided into several parts, which are shifted in the direction of rotation by ½ of cycle of the frequency component of the torque ripples to be generated by the motor.

For high-speed rotation, intermediate taps of the windings mounted round the stator salient poles lead to outside or two or more sets of windings are mounted on each stator salient pole, and the motor is equipped with a switching circuit for switching over between a first state in which these windings are connected in series and a second state in which one winding is connected to part of another winding.

In another specific motor structure, as shown in FIG. 17, the stator comprises six stator magnetic poles having a width smaller than, but substantially equal to, 60 degrees in angle of rotation of the rotor. Excitation windings are mounted one round each stator magnetic pole. The excitation windings are connected in series in such a manner that each adjacent pair of excitation windings are opposite in turning (an inverted-series-connection). Torque windings mounted round the stator magnetic poles are of a three-phase type and are angularly spaced apart one another by 180 degrees. These torque windings are an inverted-series-connected pair diametrically opposed with respect to the center of rotation of the rotor. The rotor has two rotor salient poles having a width ranging from 60 to 120 degrees in angle of rotation of the rotor.

One example control system for the motor is equipped with a torque-current drive circuit for causing, when a torque command is positive, a current having a magnitude in accordance with the torque command to flow in the torque winding of the stator magnetic pole at which a counterclockwise end of the associated rotor salient poles and for causing, when the torque command is negative, the current to flow in the torque windings of the stator magnetic pole at which a clockwise end of the associated rotor salient poles.

A control algorithm for varying a torque current is also proposed.

In another specific switched reluctance motor, common windings are mounted one round each stator salient pole, serving as both excitation and torque windings.

Another example of control system for the motor has a common-winding-current drive circuit for obtaining an excitation current such as to excite the motor in accordance with an excitation command signal, for obtaining a torque current such as to have a magnitude in accordance with a torque command, which represents a counter clockwise torque when it is positive, and to flow in the common winding of each stator salient pole, at which a counterclockwise end of the associated salient pole is located when the torque command is positive or a clockwise end of the associated salient pole is located when the torque command is negative, and for rendering a composite current, which is a sum of the excitation current and the torque current, to flow in each common winding.

In a specific structure of the motor, as shown in FIG. 1, excitation windings are mounted one round each of stator salient poles and are connected in series, and excitation currents are supplied to flow in the corresponding excitation windings of all of the stator salient poles as shown in FIG. 4.

Alternatively, the excitation windings may be omitted from the individual stator salient poles, and permanent magnets may instead be arranged one at each of the stator salient poles as shown in FIG. 9 to excite the motor.

As shown in FIGS. 1 and 2, the width of the stator salient poles is approximately 30 degrees, and the number of stator salient poles is 6. And the width of rotor salient poles is 40 degrees with a 5-degree structural skew, and the number of the rotor salient poles is 4.

A control system for causing a torque current to flow in each stator torque winding in the switched reluctance motor controls the amplitude of the torque current in accordance with the angle of rotation of the rotor. This current amplitude control, namely, varying of the current is performed by a current control section for varying the current of the torque winding of each stator salient pole while the associated rotor salient pole is located perfectly in or out of confronting relationship with the stator salient pole through its circumferential surface. More specifically, the current control section is operable for controlling, during strenuous operation, a torque current in the torque windings on each stator salient pole in such a manner that a current value of the torque current is increased from zero to a current value IP1 corresponding to a torque command value TCM while each stator salient pole is located within the width of the associated rotor recess, that the torque current flows in the corresponding torque winding to generate a rotational torque while each rotor salient pole reaches each stator salient pole surrounded by the corresponding torque winding and that the torque current is decreased from the current value IP1 to zero while each stator salient pole is located within the width of the associated rotor salient pole, and also for controlling, during regenerative operation, the torque current in the stator winding on each stator salient pole in such a manner that the torque current flows in the stator windings as its current value is increased from zero to an torque current value IP1 corresponding to an torque command value TCM while each rotor salient pole is located within the width of the associated rotor salient pole, that a regenerative rotational torque is generated while each rotor salient pole is moved away from the associated stator salient pole surrounded by the torque winding and that the torque current in the stator windings on each stator salient pole is decreased from the torque current value IP1 to zero while each stator salient pole is located within the width of the associated stator recess as each stator salient pole is moved away from the associated stator stator pole.

Alternatively, the excitation windings may be omitted, and excitation current may be superposed in the torque windings. The merit of this alternative is that the motor winding structure is simplified in the absence of excitation windings and that the drive circuit structure simplified in the absence of excitation windings. On the other hand, the load of the excitation current component is born on the torque-current drive circuit, which is large in circuit scale.

In the excitation-winding-free motor structure, the excitation current component for generating a torque opposite to the torque command may be eliminated.

Two sets of windings are mounted around each stator salient pole, and transistors are rendered to assume the ON state to supply voltage and current to one set of stator windings to increase the current. To decrease the current, the transistor is rendered to assume the OFF state to supply energy back to the power sources via a diode by the voltage induced by the other set of stator windings, which are electromagnetically coupled, thus decreasing the total stator current of that stator.

As a measure to minimize torque ripples, the rotor or stator may be axially divided into halves, which are shifted in the direction of rotation by ½ of cycle of the frequency component of the torque ripples to be generated by the motor. Further, the similarly divided rotor or stator is overlapped over this divided rotor or stator to form a double-pair laminate, in which the succeeding pair is shifted in the direction of rotation by ½ of cycle of the frequency component with respect to the preceding pair. The result is that the two frequency components of the torque ripples can be further minimized.

For high-speed rotation, intermediate taps of the windings mounted round the stator salient poles lead to outside, or two or more sets of windings are mounted on each stator salient pole, and the motor is equipped with a switching circuit for switching over between a first state in which these windings are connected in series and a second state in which one winding is connected to part of another winding. Thus, by controlling the low-voltage windings, it is possible to control the high-speed rotation.

Although the polarity of each rotor salient pole depends on the angular position of the rotor, the two-pole rotor provides a constant magnetic flux all times. It is therefore possible to make the magnetic energy inside the motor basically constant irrespective of the position of rotation of the rotor. When the excitation current is supplied to flow in all of series-connected excitation windings, any of the excitation windings is decreased in magnetic flux with the rotation of the rotor to generate a negative voltage and, at the same time, any of the remaining excitation windings is increased in magnetic flux to generate a positive voltage. Accordingly, the total voltage of the series-connected excitation windings is only the voltage effect of the winding resistance so that basically a voltage causing the magnetic flux to vary will be generated. Consequently, a very simple excitation control of the drive system will suffice. Regarding the gap between adjacent stator magnetic poles, if it is small, its bad influence of the gap-will be small, and even if it is large, it is possible to minimize the bad influence by skewing the rotor or stator.

Because torque generation is achieved by magnetic attraction, it is possible to generate a desired torque inside the stator magnetic pole confronting the rotor salient pole by supplying a torque current to flow in the torque winding of the stator magnetic pole. By repeating this operation successively with respect to the torque windings of the remaining stator magnetic poles, successive rotational torques can be obtained.

The stator magnetic pole is located perfectly in or out of confronting relationship with the entire circumferential surfaces of the associated rotor salient pole, namely, no induction voltage of each windings is generated. By varying the current of the torque windings using this range of rotational angle, it is possible to perform current control with less torque ripples.

Further, as a measure to reduce the total cost of the switched reluctance motor and the drive system, a plurality of regenerative windings are mounted one on each stator magnetic pole. For utilizing part of the magnetic energy of each stator magnetic pole to rotate the rotor and supplying part of the remaining magnetic energy to flow back to the power source, a motor-energy regenerating circuit is composed of a plurality of diodes each connected in series between each of the regenerative windings and the power source of the motor. Each diode has an anode connected to a low-voltage side of the power source and a cathode connected to a high-voltage side of the power source. This motor-energy regenerative circuit is simple in structure as the number of either the power transistors or the diodes can be reduced to 3, as compared with 6 in a conventional regenerative circuit.

BRIEF DESCRIPTION OF THE DRAWINGS

FIGS. 24(a) through 24(f) are control characteristic charts of a conventional switched reluctance motor.

DESCRIPTION OF THE PREFERRED EMBODIMENTS

The principles of the present invention are particularly useful when applied to a switched reluctance motor and related control system, preferred embodiments of which will now be described in detail with reference to the accompanying drawings.

Figure 1:
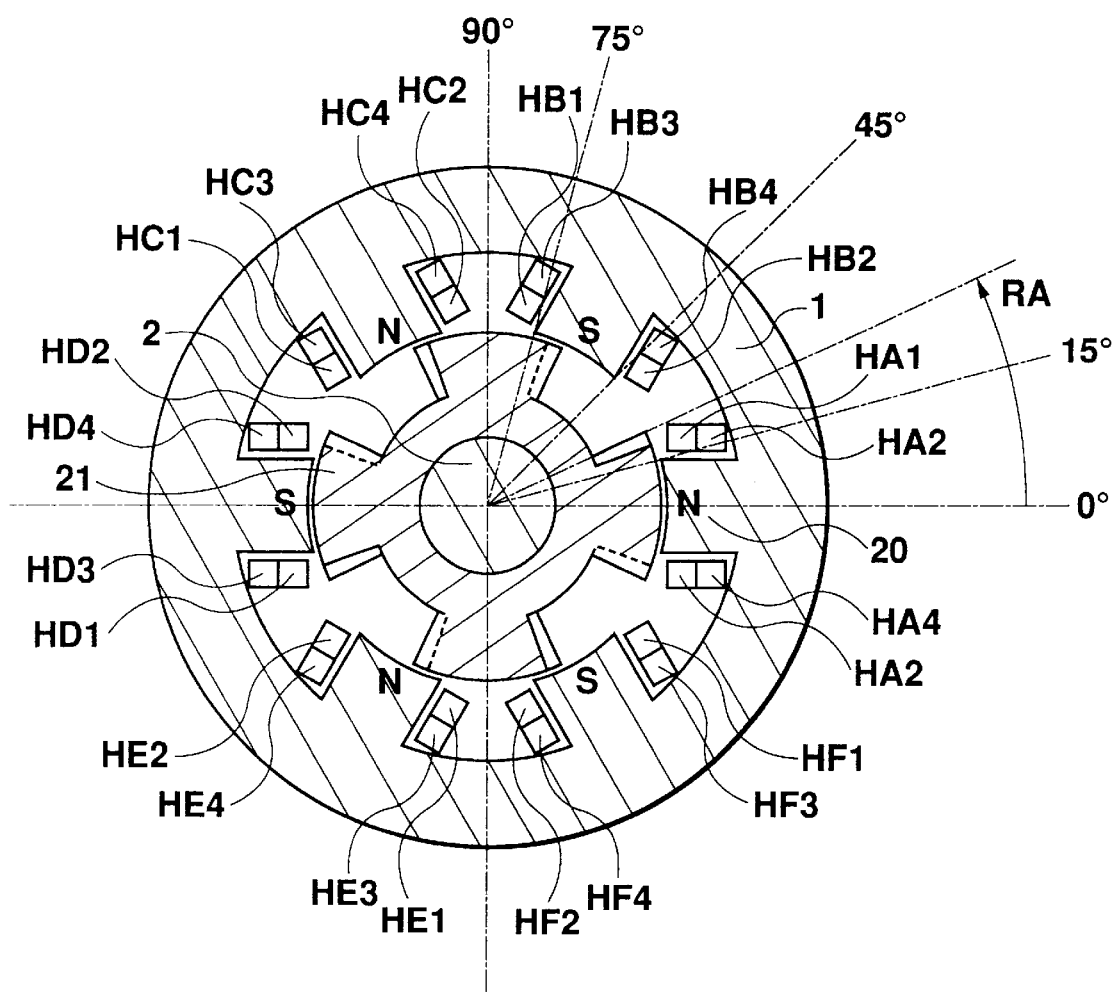
FIG. 1 is a cross-sectional view of an example typical switched reluctance motor of the present invention.

FIG. 1 shows a switched reluctance motor according to a first embodiment of the present invention.

Reference number 1 in FIG. 1 is a stator surrounding a rotor and equipped with six stator salient poles 20 each having a width of substantially equal to 30 degrees in angle of rotation of a rotor. Excitation windings and torque windings are mounted round each stator salient pole 20. In the excitation windings, those indicated by HA3, HA4 are WAF windings, those indicated by HB3, HB4 are WBF windings, those indicated by HC3, HC4 are WCF, those indicated by HD3, HD4 are WDF windings, those indicated by HE3, HE4 are WEF, and those indicated by HF3, HF4 are WFF windings. In the torque windings, those indicated by HA1, HA2 are WAT windings, those indicated by HB1, HB2 are WBT windings, those indicated by HC1, HC2 are WCT windings, those indicated by HD1, HD2 are WDT windings, those indicated by HE1, HE2 are WET windings, and those indicated by HF1, hF2 are WFT windings. A, B, C, D, E, F of WAF, WBF, WCF, WDF, WEF, WFF, WAT, WBT, WCT, WDT, WET, WFT designate the individual stator salient poles.

Each of the stator 1 and the rotor is composed of silicon steel disks laminated along its axis.

The rotor is equipped with four salient poles 21 arranged around a rotor shaft 2 and each having a width of approximately 40 degrees in angle of rotation of the rotor and individually skewed by 5 degrees during lamination.

Figure 2:
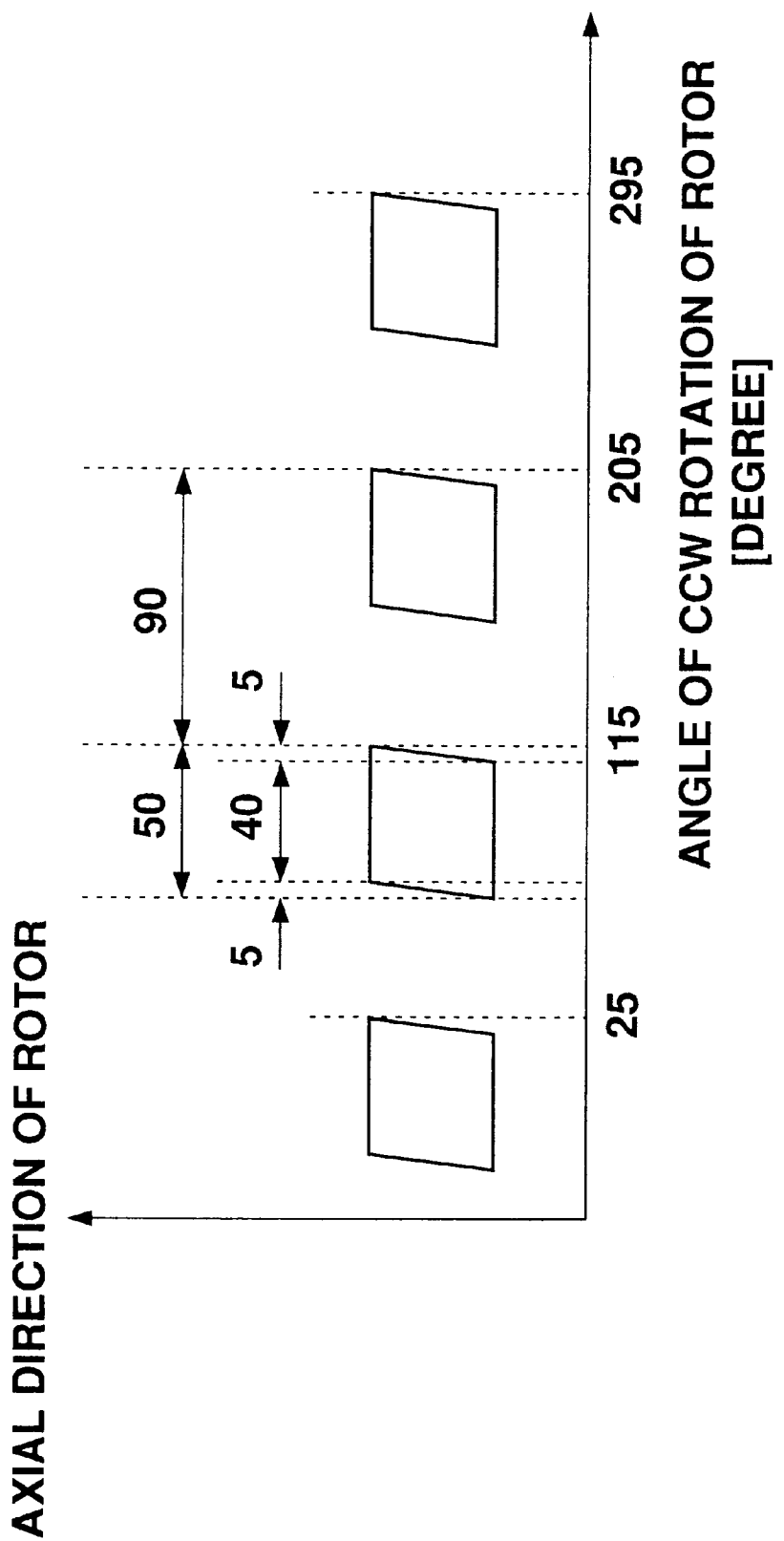
FIG. 2 is a diagram showing surfaces of salient poles of a rotor of the switched reluctance motor as unfolded in plan in the direction of rotation of the rotor.

FIG. 2 is a diagram showing circumferential surfaces of the four salient poles of the rotor as unfolded in plan in the direction of rotation of the rotor. Accordingly the width of each rotor salient pole is approximately 50 degrees including skewed portions, as shown in FIG. 2.

Figure 3:
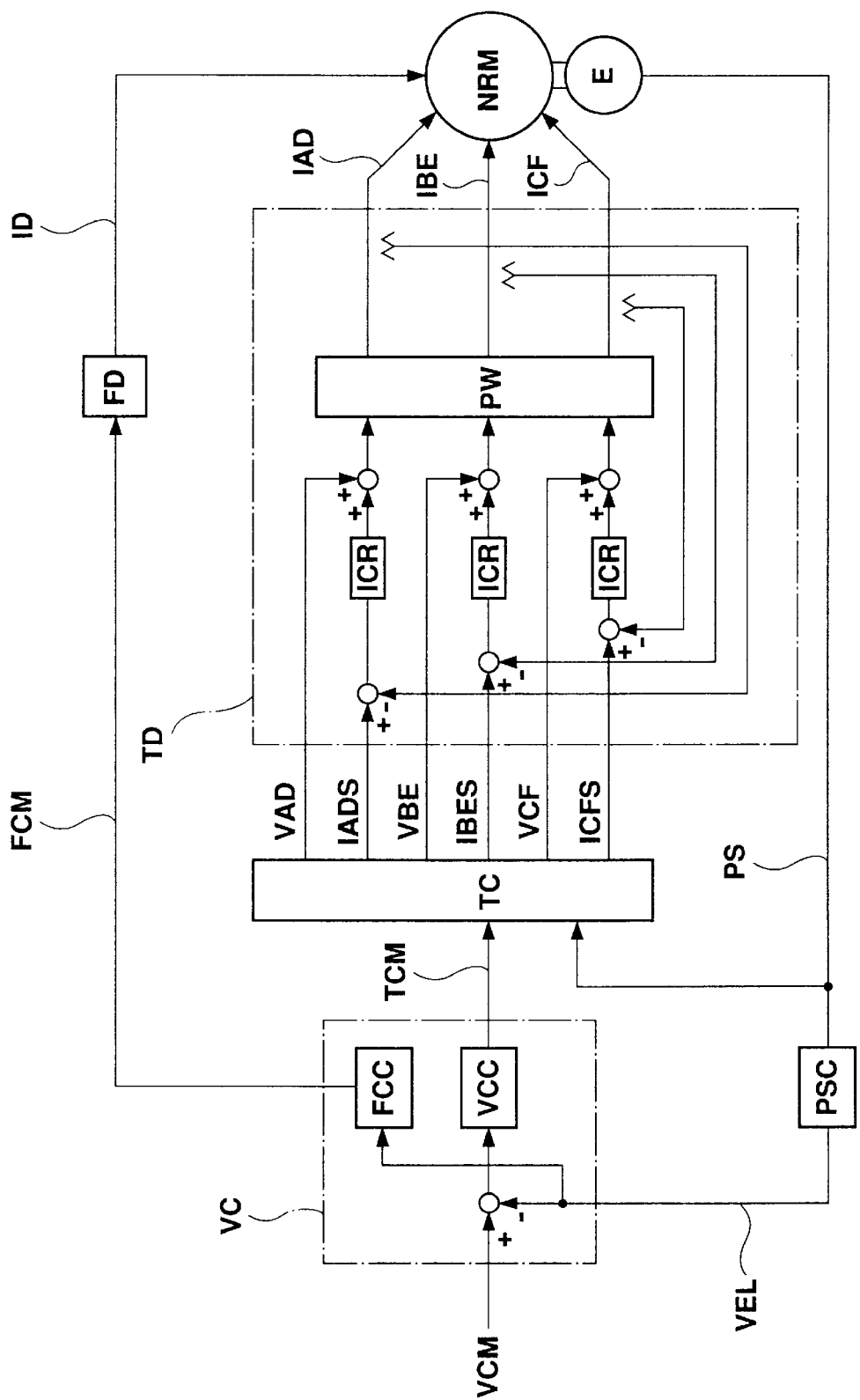
FIG. 3 is a block diagram showing a preferred embodiment of a motor control system of the present invention.

FIG. 3 shows a speed control system for the motor. NRM designates the motor of FIG. 1.

E designates an encoder for detecting an angle of rotation of the rotor to output a position detection signal PS.

PSC designates a velocity detecting section for detecting a velocity signal VEL based on the input of the position detection signal PS.

VC designates a velocity control section composed of a velocity controller VCC for obtaining a torque command signal TCM based on the input of a velocity command VCM and the velocity signal VEL and a field current controller FCC for obtaining and outputting a field current command FCM based on the input of the velocity command VCM and the velocity signal VEL.

FD designates a field-current control section for causing a field current ID to the motor NRM in accordance with the field current command FCM. The field current command FCM is a constant value when the motor NRM is rotating at an rpm less than a predetermined base value and a value gradually descending with the rpm of the motor when the last-named rpm. is larger than the base value. This is because a motor induction voltage will fall below a power source voltage when the rpm. is larger than the base value. The typical so-called field attenuation control method for reducing the field current command FCM with rpm. is a method in which the field current command FCM plays as a reciprocal function of the rpm. of the motor when the rpm is over the base value. If it is small, the torque command is practically effective as a small field current command value in not only reducing possible heat the motor might generate but also minimizing a possible torque ripple.

Figure 4:
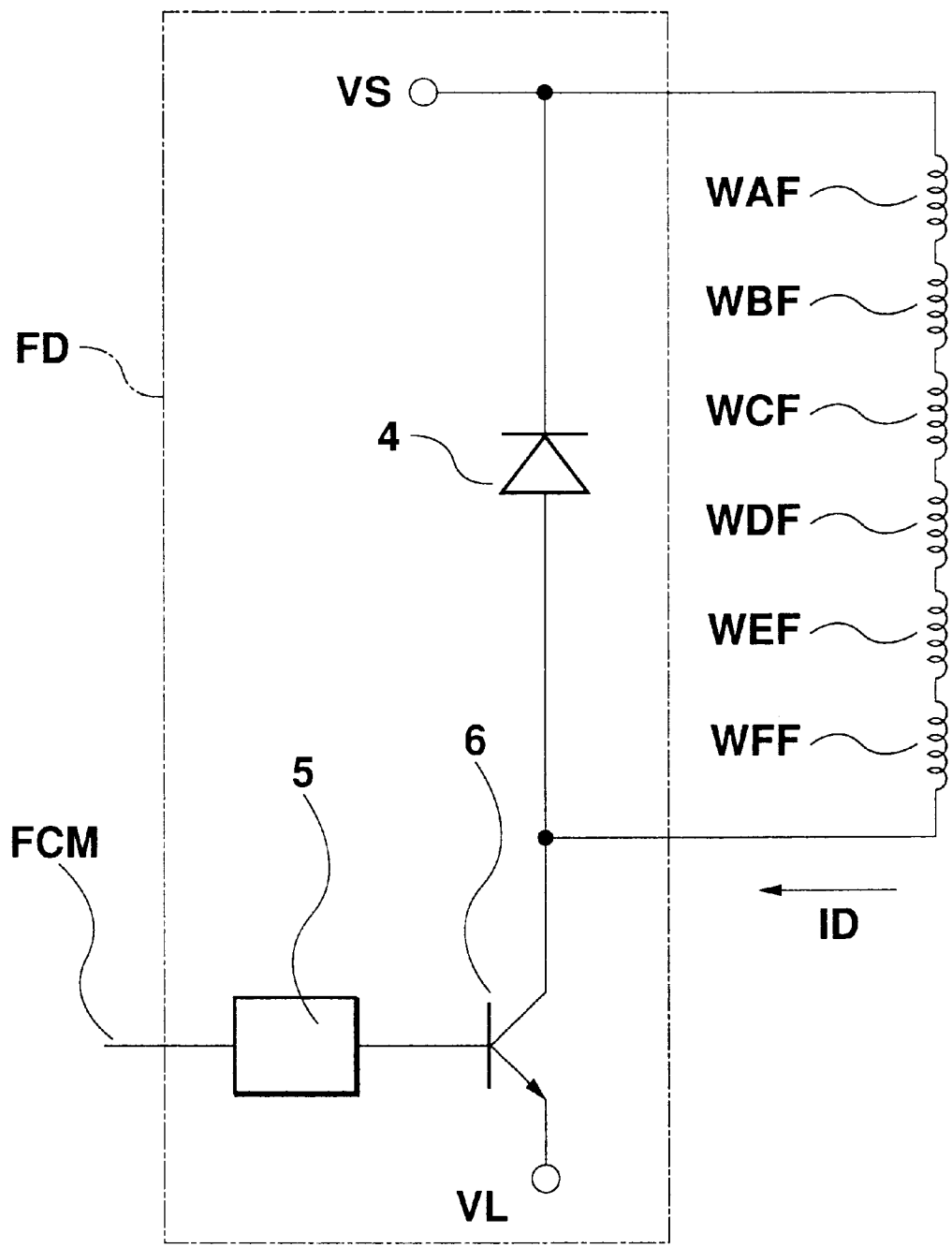
FIG. 4 is a diagram showing an example of field-current control section FD.

FIG. 4 is a diagram showing the manner in which a power circuit is connected to the individual excitation windings in the field current control section FD. Each excitation winding WAF, WBF, WCF, WDF, WEF, WFF mounted around each stator salient pole is reversely wound with respect to those round adjacent stator salient poles so that each adjacent pair of stator salient poles will be respectively polarized as N and S poles as shown in FIG. 1 when direct current flows in these excitation windings as shown in FIG. 4. The label 5 designates a field current control circuit for appropriately controlling a field current ID; 6, a drive transistor; 4, a flywheel diode.

As shown in FIG. 1, the area of portions at which the rotor salient poles confront the stator salient poles remains constant, irrespective of the position of rotation of the rotor, and every stator salient pole is polarized as an N or S pole so that, although the polarity of magnetic flux will change over between N and S poles depending on the angular position of the rotor, the absolute value of the magnetic flux will be constant all times. When an excitation current flows in the individual excitation windings all connected in series, the total magnetic flux of the motor does not vary even when the rotor rotates, and therefore any excitation winding will decrease in magnetic flux to generate a negative voltage and, at the same time, any other excitation will increase in magnetic flux to generate a positive voltage, thus resulting in that a total voltage of the series-connected excitation windings will give a voltage effect of the resistance component of the windings but will basically not generate any voltage due to the variation of magnetic flux. Therefore, a very simple excitation control by the field current control section as shown in FIG. 4 will be sufficient. Further, if such a resistance of the excitation windings as to satisfy (voltage VS−VL)=(excitation current ID)×(total resistance of excitation windings) is selected, only connecting the excitation windings to the power source is needed, so the excitation circuit FD of FIG. 4 is also not needed.

The same result as described above can be achieved when each three phase excitation windings is divided two sets and connected to an excitation current drive circuit respectively. The excitation circuit FD is not limited to the configuration shown FIG. 4.

The functional advantage of the motor of FIG. 1 is that since magnetic energy is automatically be exchanged between the excitation windings, the load of the torque current control system will be reduced, as compared to the conventional concept in which the voltage load of the excitation current drive of the conventional control system will rise, particularly during high-rpm control.

The phenomenon that no rotational torque is generated as magnetic energy insures that positive and negative torques generated at opposite ends of the rotor cancel each other. Therefore, no reluctance torque will not be generated in the motor as a whole, while only excitation current flows in the excitation windings. When the stator salient pole and the rotor salient pole are moved toward or away from each other, a slight discontinuity will occur in their boundary region, but basically a torque ripple will be small. Possible negative influence of this torque ripple can be minimized by tilting or skewing rotor or stator.

As will be described below, a rotational torque can be generated by adding a torque current while this excitation current flows in the excitation windings. At that time the power factor of the torque current is large as the current and the voltage substantially coincide in time phase.

TC designates a torque control section responsive to the input of the torque command signal TCM and the position detection signal PS for outputting individual phase current commands IADS, IBES, ICFS of the motor NPM and voltage feedforward signals VAD, VBE, VCF of the individual phases as an end voltage of each phase is assumed.

TD designates a current control section that obtains, for one phase, the difference between detected values of the current command IADS and the current IAD to perform a process, such as a proportional integral control by a current controller ICR, then adds the voltage feedforward signal VAD and outputs the voltage command signal to the power amplifier circuit PW. The procedure is followed for the remaining phases.

The power amplifier circuit PW, for the phase of the current IAD, is responsive to the input of the voltage command signal to drive below-described transistors 8, 9 of FIG. 5 by the very ordinary PWM operation and supplies a current IAD to the motor NRM.

Figure 5:
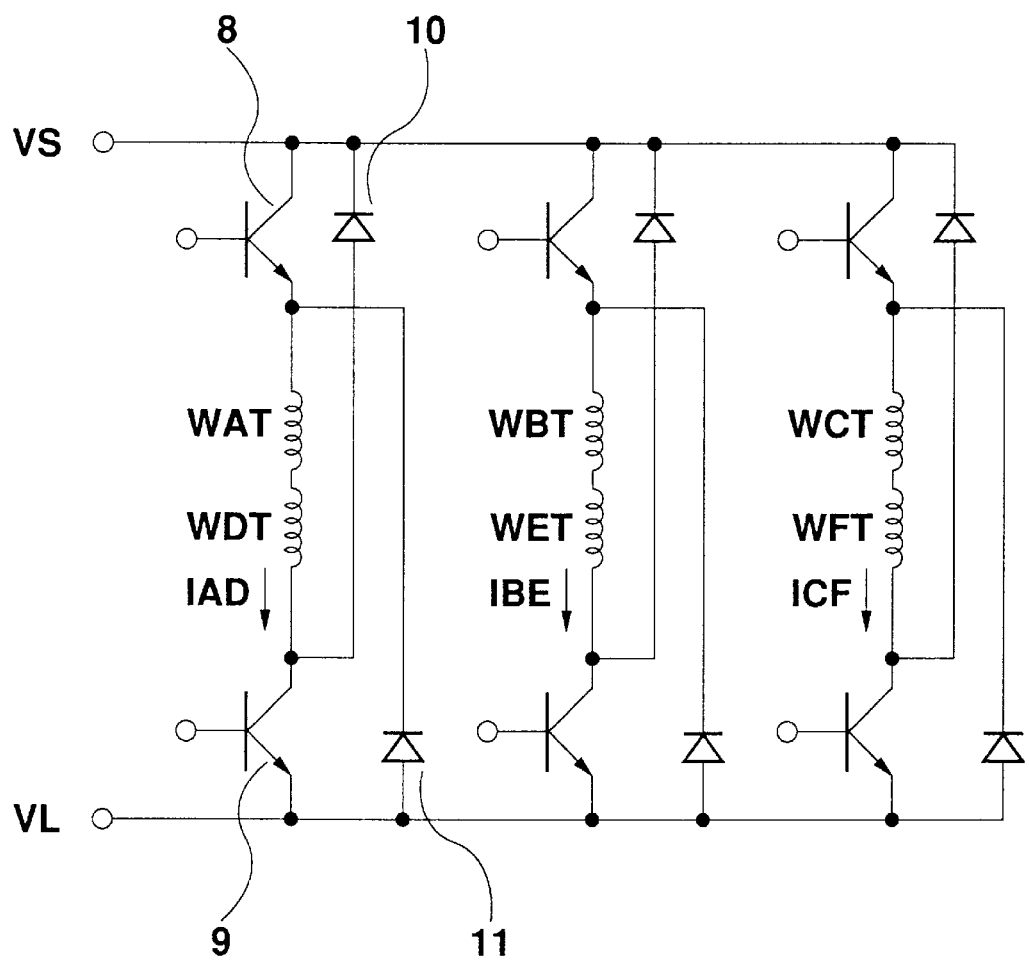
FIG. 5 is a circuit diagram showing a power amplifier circuit PW of a current control section.

FIG. 5 shows the manner in which power circuits of the power amplifier circuit PW are connected with the individual torque windings of the stator. WAT designates torque windings indicated by HA1, HA2, and WDT designates torque windings indicated by Hd1, HD2. 8, 9 designate drive transistors, and 10, 11 designate regenerative flywheel diodes. The toque windings WAT and WDT are mutually reversely wound and are connected in series. The current direction of the excitation windings and the current direction of the torque windings in each stator salient pole coincide. When the torque current IAD flows, the transistors 8, 9 will be switched on; when the transistors 8, 9 are switched off, the current IAD will be supplied back to the power sources VS, VL via the flywheel diodes 10, 11. VL is a common line of the power circuits.

As the result of this PWM control, the current IAD will become pulsatile with respect to the current command IADS as processed by the PWM control, but the general current will be controlled in accordance with the command. Accordingly, the average current value will be in accordance with the current command IADS.

Regarding current control for the current IBE of the windings WBT, WET and the current ICF of the windings WCT, WFT, the power amplifier circuit PW performs the same process as for the current LAD.

Figure 6:
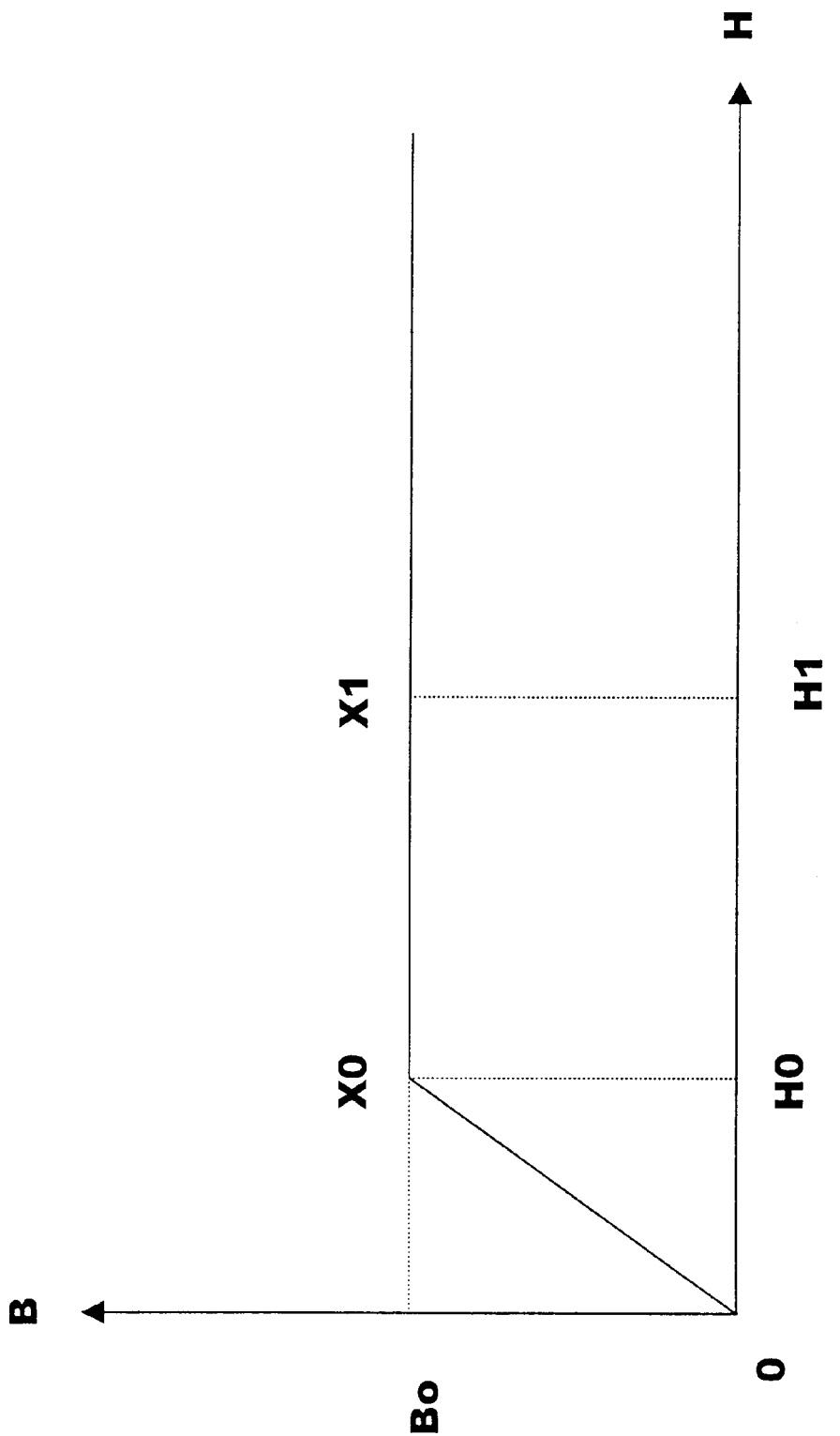
FIG. 6 is a graph showing the magnetic characteristics of magnetic material of the motor.

The relation between the excitation current and torque current and the magnetic energy inside the motor will now be described quantitatively. FIG. 6 is a graph showing a magnetic characteristic of the motor as a model; the horizontal coordinate is the electromotive force H and the vertical coordinate is the magnetic flux density B. When the excitation current flows in the excitation windings in such a manner that the electromotive force will be H0, the magnetic flux density of the excited magnetic circuit of the motor will be B0 with an operating point being X0. The magnetic energy inside the magnetic circuit is indicated by a triangle OX0B0. When the torque current flows in the torque windings by the difference between H1 and H0, the operating point shifts to X1 so that variation of the magnetic energy inside the motor will be small, e.g. zero in FIG. 6. Thus, since the variation of magnetic flux due to the torque current in the torque-current variation control is small, inductance is small and controllability is high.

Figure 7:
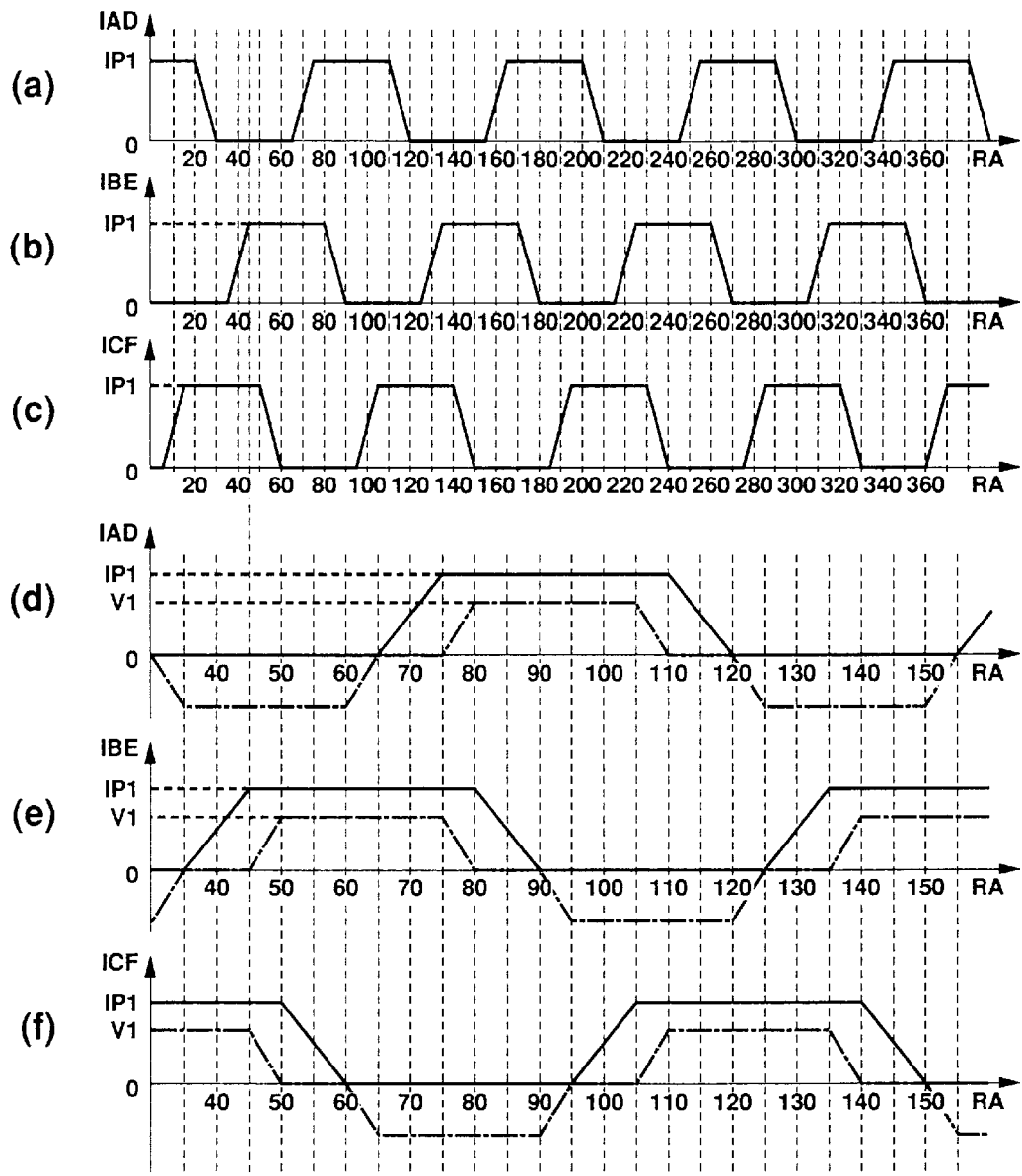
FIGS. 7(a) through 7(f) are control characteristic charts of a control system of the present invention.

The relation between the torque generation and the current in the individual torque winding is shown in FIGS. 7(*a*) through 7(*f*) and 8(*a*) through 8(*f*) as characteristics relation between the individual current value and the rotational angle RA.

In FIG. 1, RA is an angle between the horizontal center line of the rotor and the end of counterclockwise rotation of the rotor salient pole.

The relation between the torque generation and the current in the individual torque winding is shown in FIGS. 7(*a*) through 7(*f*) and 8(*a*) through 8(*f*) as characteristics relation between the individual current value and the rotational angle RA.

First, the value of the excitation current ID is constant ID1 irrespective of the rotational angle RA.

Assuming that the rotational angle RA gradually increases from zero, in other words, the rotor is rotating counterclockwise, a constant torque will be generated as the individual currents flow in the corresponding windings with a phase difference of 60 degrees in the rotor's rotational angle RA as shown in FIGS. 7(*a*), 7(*b*) and 7(*c*). A range of the rotor's rotational angle RA from 30 to 150 degrees is shown on an enlarged scale in FIGS. 7(*d*), 7(*e*) and 7(*f*), with reference to which the detailed description will now be made. Solid lines represent the flowing current, and dash-and-dot lines represent the induction voltage induced by the torque winding.

The description will begin with the induction voltage induced by the winding of each phase.

When the rotor is rotating at a constant rpm. in the counterclockwise direction CCW, the voltage to be induced by the torque windings WAT, WDT is proportional to the ration of variation of magnetic flux crossing each winding. Therefore, as shown in FIG. 7(d), while RA is within a range of 30 to 35 degrees, a negative voltage will begin to be generated as a skewed part of end of the rotor begins to be displaced off the position of the confronting stator salient pole. And within a range of 35 to 60 degrees, a constant voltage −V1 will be induced as the rotor salient pole begins to be displaced off the position of the confronting stator salient pole with rotation, and within a range of 60 to 65 degrees, the voltage will be gradually reduced to zero as the end of the skewed portion of the rotor salient pole is displaced off the confronting stator salient pole. Within a range of 65 to 75 degrees, no voltage will be generated as the rotor salient pole does not confront the stator salient pole; within a range of 75 to 80 degrees, a positive voltage will begin to be increased as the skewed part of end of the rotor begins to be located within the width of the confronting stator salient pole; and within a range of 80 to 105 degrees, a constant voltage V1 will be induced as the rotor salient pole confronts the stator salient pole by an increasing overlapping width with rotation. Within a range of 105 to 110 degrees, the voltage will be gradually lowered to zero as the counterclockwise (CCW) end of the skewed part of the rotor begins to be displaced off the stator salient pole; and within a range of 110 to 120 degrees, no voltage will be generated as the stator salient pole is located within the width of the rotor salient pole. The cycle of process will then be repeated.

The current to flow in the torque windings WAT, WDT will next be described. As a practical method dealing with current flow, the current is controlled to vary within the time range when no voltage is generated, causing no torque to occur. Since the form of A3 variation of the current will influence on the motor torque within that time period, it is possible to vary the current sharply and easily when the maximum voltage is applied. The current is increased from zero to IP1 while the rotor's rotational angle RA is within a range of 60 to 75 degrees, then is kept constant at IP1 while RA is within a range of 75 to 110 degrees, and is then lowered from IP1 to zero while RA is within a range of 110 to 120 degrees. Because the power is a product of the current and the voltage, a torque proportional to the voltage within the RA range from 75 to 110 degrees will be generated as energy is supplied to the motor.

The voltage and current of the remaining torque windings WBT, WET are as shown in FIG. 7(e). Their phases are delayed by 60 degrees from those of FIG. 7(d). Likewise the voltage and current of the torque windings WCT, WFT are as shown in FIG. 7(f), and their phases are delayed by 120 degrees from those of FIG. 7(d). The total torque of three phases of FIGS. 7(a), 7(b) and 7(c) takes a constant value irrespective of the rotational angle of the rotor.

The manner in which a clockwise torque corresponding to the current amplitude IP1 is continuously generated as the rotor is rotating in the counterclockwise direction CCW will now be described. This is the case the motor performs a regenerative operation.

First, the value of the excitation current ID is constant ID1 irrespective of the rotational angle RA.

Figure 8:
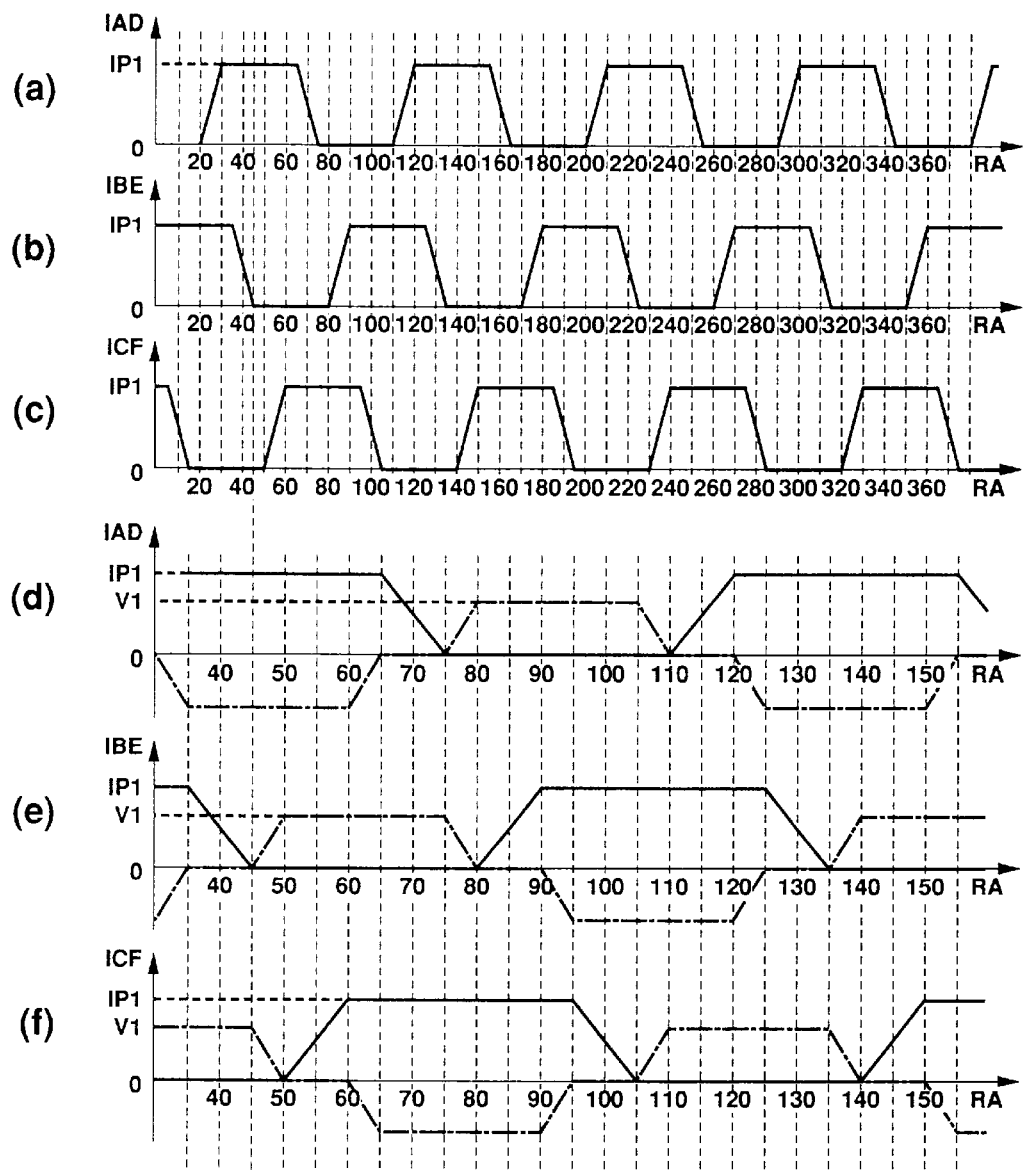
FIGS. 8(a) through 8(f) are control characteristic charts of the control system of the present invention.

Assuming that the rotational angle RA gradually increases from zero, namely, the rotor is rotating counterclockwise, a constant torque will be generated as the individual currents flow in the corresponding windings with a phase difference of 60 degrees in the rotor's rotational angle RA as shown in FIGS. 8(a), 8(b) and 8(c). A range of the rotor's rotational angle RA from 30 to 150 degrees is shown on an enlarged scale in FIGS. 8(d), 8(e) and 8(f), with reference to which the detailed description will now be made. Solid lines represent the flowing current, while broken lines represent the induction voltage induced by the torque winding.

The induction voltages induced by the windings of the individual phases are the same as those of FIGS. 7(d), 7(e) and 7(f) in terms of the rotational direction and excitation current.

The current to flow in the torque windings WAT, WDT will next be described. As a practical method dealing with current flow, the current is controlled to vary within the time range when no voltage is generated, causing no torque to occur. The direction of the torque is opposite and hence the timing at which the current flows is opposite, as compared to the case of FIGS. 7(a) through (f).

In FIG. 8(d), the excitation current is maintained at a constant value IP1 while the rotor's rotational angle RA is within a range of 30 to 65 degrees, then is decreased from PI1 to zero within a range of 65 to 75 degrees, is kept zero within a range of 75 to 110 degrees and is increased from zero to IP1 in a range of 110 to 120 degrees. Because the power is a product of the current and the voltage, the power is negative within a range of 75 to 110 degrees so that energy will be supplied back to the power source and a braking torque will be generated within that range. The magnitude of this braking torque is proportional to the voltage.

The voltage and current of the remaining torque windings WBT, WET are as shown in FIG. 8(e), and their phases are delayed by 60 degrees from those of FIG. 8(d). Likewise, the voltage and current of the torque windings WCT, WFT are as shown in FIG. 8(f), and their phases are delayed by 120 degrees from those of FIG. 8(d). The total torque of three phases of FIGS. 8(a), 8(b) and 8(c) takes a negative constant value irrespective of the rotational angle of the rotor. Accordingly, a constant braking torque is generated.

Of the induction voltages indicated by dash-and-dot lines in FIGS. 7(d) to 7(f) and 8(d) to 8(f), the induction voltage while the current in each phase flows may be treated as the voltage feedforward signal VAD, VBE, VCF.

The generation of torque is associated with the current in each phase and with the rotational position, but is not associated with the rotational direction and the rotational speed.

Figure 9:
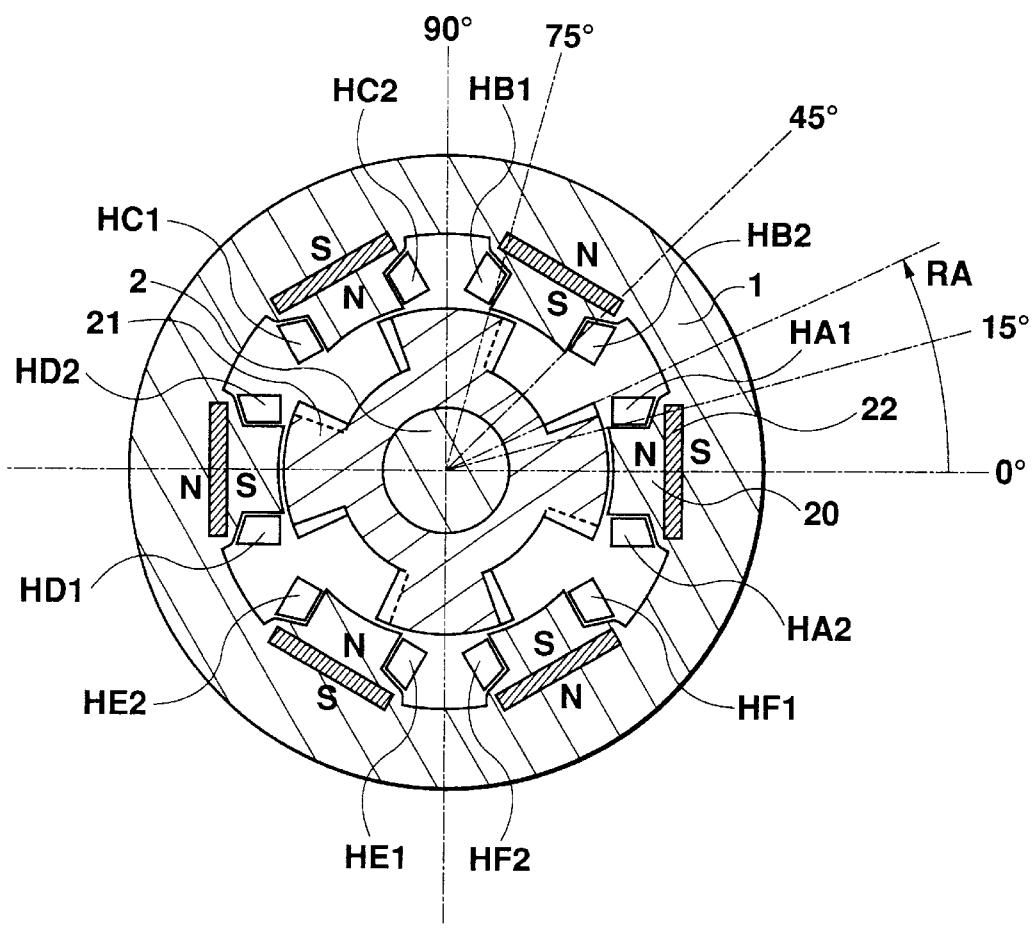
FIG. 9 is a cross-sectional view of a switched reluctance motor of the present invention.

FIG. 9 shows another switched reluctance motor according to a second embodiment of the present invention.

The motor of FIG. 9 differs from that shown in FIG. 1 in that the excitation windings are omitted and, instead, permanent magnets 22 are inserted one in each stator salient pole for generating electromotive forces. The drive system and control method for this motor are substantially similar to those for the motor of FIG. 1. In the absence of the excitation windings, an improved motor efficiency can be achieved. Further, the motor of this embodiment is suitable for use as a servo motor, which must be stopped by a dynamic brake in case of power failure or emergency. In the permanent-magnet-free motor of FIG. 1, it is difficult to make a dynamic brake.

Figure 10:
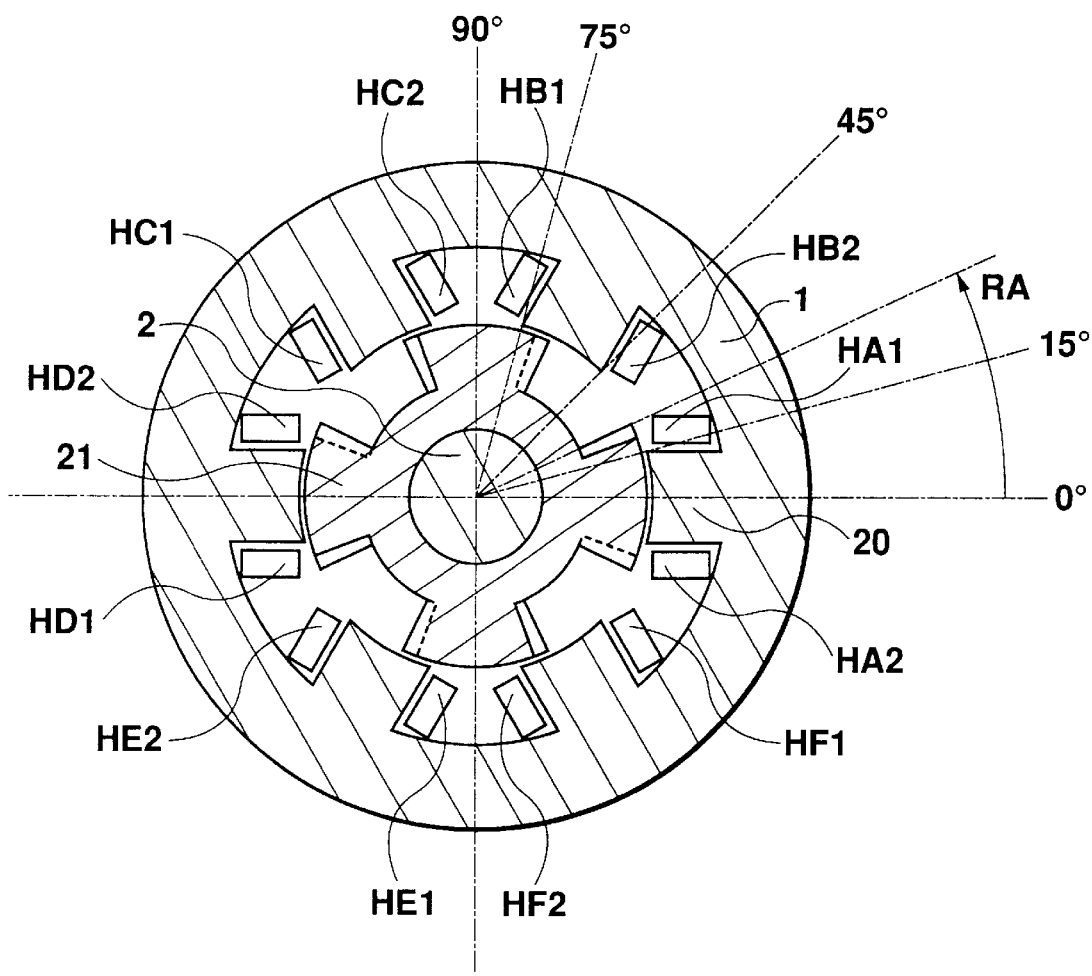
FIG. 10 is a cross-sectional view of another switched reluctance motor of the present invention.

FIG. 10 shows still another switched reluctance motor according to a third embodiment of the present invention.

In the motor of FIG. 10, the excitation winding and torque winding of the stator are combined as a composite winding in which the sum of excitation and torque currents is to flow.

A non-illustrated speed control system for this motor is identical with that of FIG. 3 except that the field-current control section is omitted and, instead, in the torque control section, the excitation current component of each stator winding also is obtained and is added to the torque current component to create an individual current command IADS, IBES, ICFS.

The relation between the torque generation and the current in the individual torque winding is shown in FIGS. 11(a) through 11(f) as characteristics relation between the individual current value and the rotational angle RA.

The manner in which a counterclockwise torque corresponding to the current amplitude IP1 is continuously generated will now be described.

Figure 11:
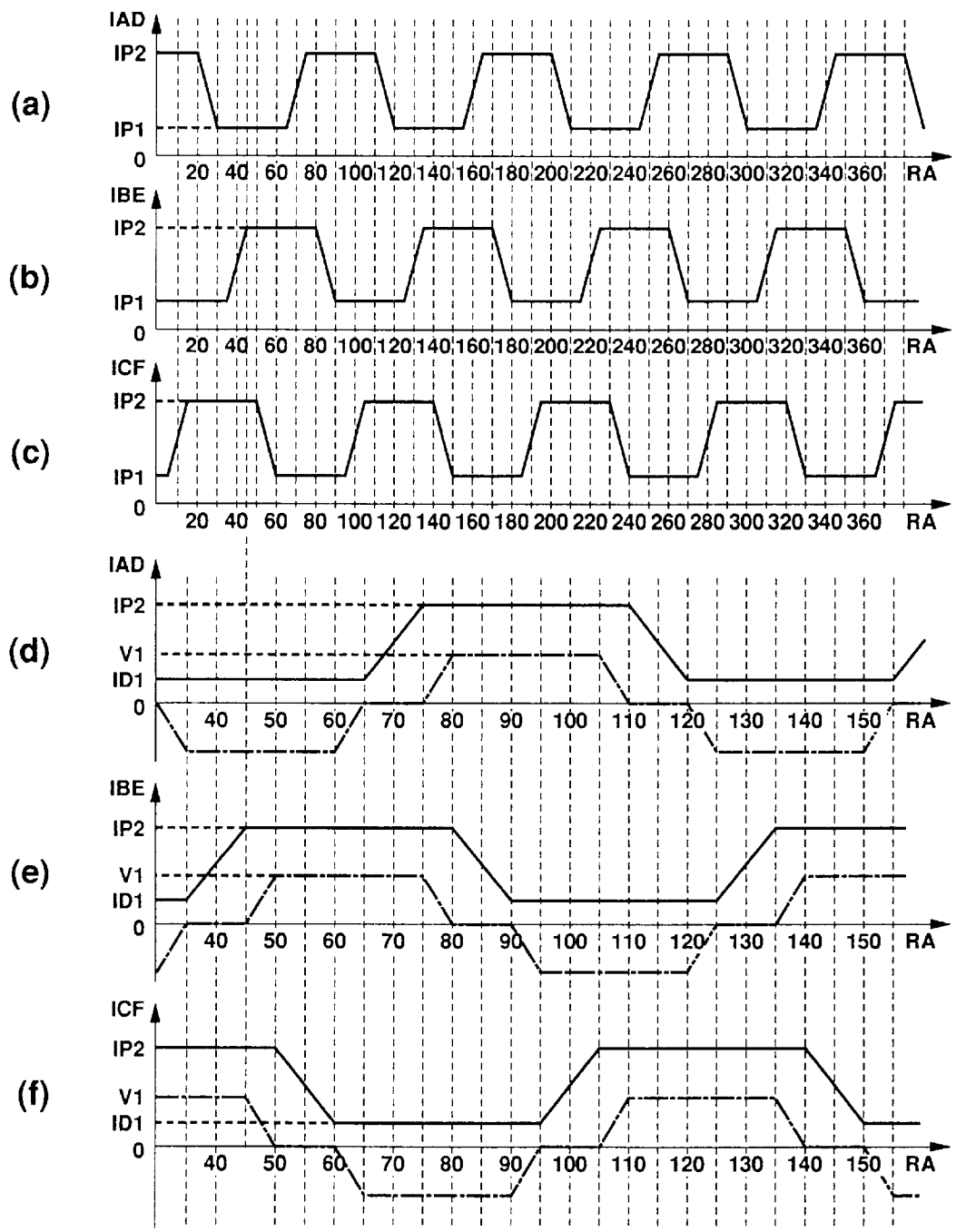
FIGS. 11(a) through 11(f) are control characteristic charts of a control system of the present invention.

When the rotational angle RA gradually increases from zero, namely, the rotor is rotating counterclockwise, the currents IAD, IBE, ICF of the individual stator windings are controlled as shown in FIGS. 11(a), 11(b) and 11(c). A range of the rotor's rotational angle RA from 30 to 150 degrees is shown on an enlarged scale in FIGS. 11(d), 11(e) and 11(f).

First, the induction voltages indicated by the broken lines in FIGS. 11(d), 11(e) and 11(f) are identical with those of FIGS. 7(d), 7(e) and 7(f) in terms of composite currents, except that the current IAD, IBE, ICF of each stator winding is the sum of each current of 7(d), 7(e) and 7(f) and the excitation current component ID1. The obtained torque characteristics also identical with that of FIGS. 7(d), 7(e) and 7(f) except that the current load of each transistor of the power amplifier circuit PW of FIG. 5 is increased when this motor is controlled by the speed control system and that vibration and noise of the motor tend to increase if the current controlling of the speed control system is delayed from an ideal value by the load part of the excitation current in high-speed rotation.

FIGS. 12(a) through 12(f) are time charts showing the manner in which the motor of FIG. 10 is controlled by a control method different from that of FIGS. 11(a) through 11(f).

In the control method of FIGS. 11(a) through 11(f), no torque is generated in the direction of torque command and even there is a current component to generate a reverse torque. Consequently, in the control method of FIGS. 12(a) through 12(f), the current component of this reverse torque is zeroed.

The manner in which a counterclockwise torque corresponding to the current amplitude IP1 is continuously generated will next be described.

Figure 12:
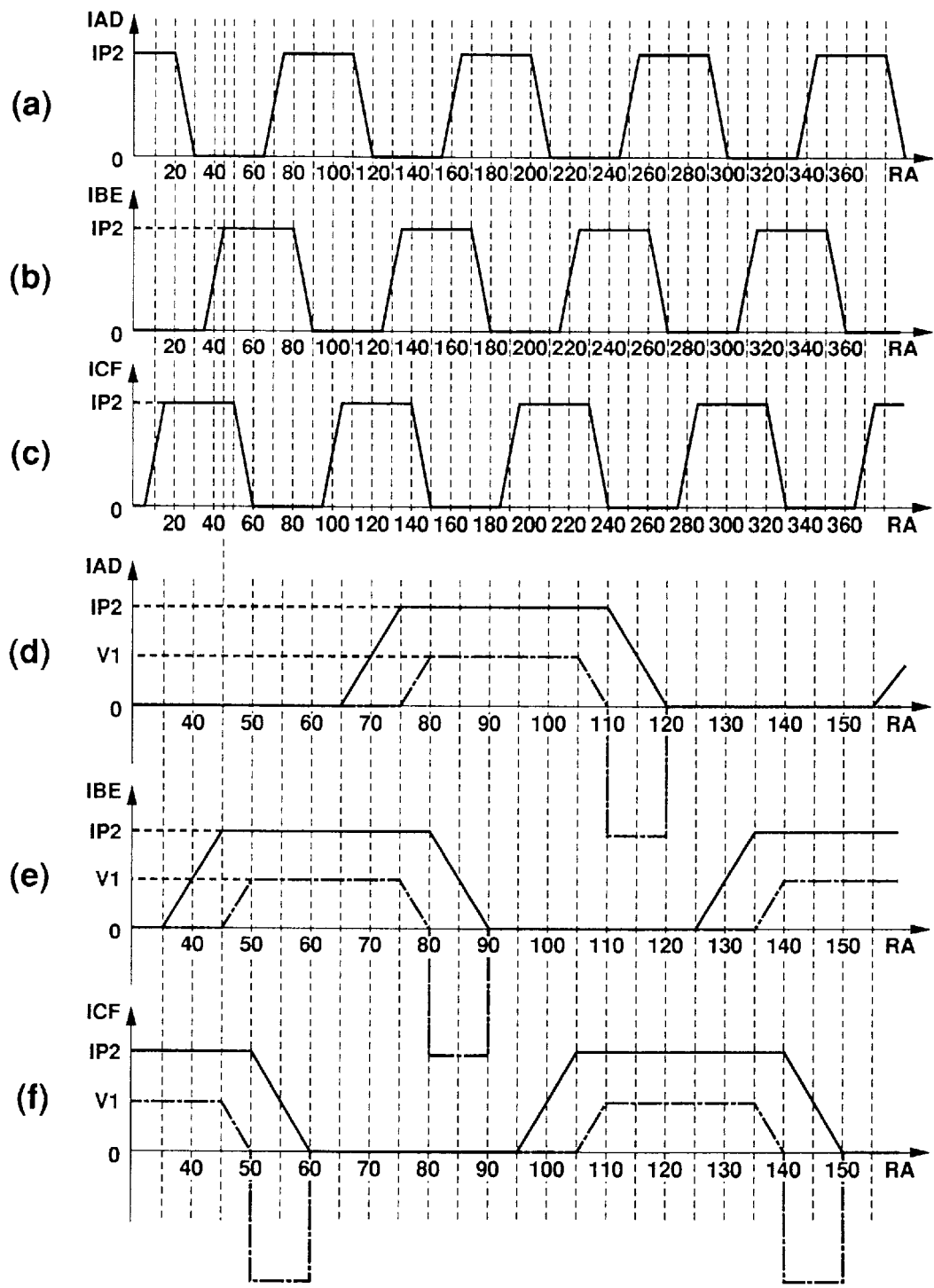
FIGS. 12(a) through 12(f) are control characteristic charts of the control system of the present invention.

When the rotational angle RA gradually increases from zero, in other words, the rotor is rotating counterclockwise, the currents IAD, IBE, ICF of the individual stator windings are controlled as shown in FIGS. 12(a), 12(b) and 12(c). A range of the rotor's rotational angle RA from 30 to 150 degrees is shown on an enlarged scale in FIGS. 12(d), 12(e) and 12(f).

The current IAD is kept zero while the rotor's rotational angle is within a range of 0 to 65 degrees, is then increased from zero to IP2 within a range of 65 to 75 degrees and is kept at IP2 within a range of 75 to 110 degrees. Likewise in FIGS. 11(a) through 11(f), the induction voltage induced by the winding is indicated by dash-and-dot lines, and the power, which is a product of the voltage and current, is supplied from the speed control system to the motor. One part of this power will be the magnetic energy inside the motor and the other part of the power will be a torque generated by the motor as a mechanical output. Within a range of 75 to 80 degrees, the voltage is gradually increased as the skewed end of the rotor salient pole enters the width of the confronting stator salient pole, and the magnetic energy component of the power is accumulated inside the motor whole the remaining power is converted into mechanical energy. Within a range of 80 to 105 degrees, the power (ID1×V1/2) is accumulated inside the motor as magnetic energy while the remaining power is converted as mechanical energy. The term "mechanical energy" refers chiefly to dynamic energy and a real load on the side of the load including the rotor. Within a range of 110 to 120 degrees, the current IAD is decreased from IP2 to zero. In this range, the rotor salient pole is located in perfect confronting relationship with the associated stator salient pole so that no rotational attraction or rotational torque with respect to each other will be generated as a negative power, which is a product of voltage and current, is supplied to the motor. Namely, magnetic energy inside the motor will be supplied back to the power amplifier circuit PW. Thus mechanical energy is supplied to the motor as magnetic energy is supplied from the power amplifier circuit PW to the motor and vice versa. In FIG. 12(d), unlike in FIG. 11(d), the current ID1 is kept zero while the rotor's rotational angle RA is within a range of 0 to 65 degrees, and a clockwise rotational torque, which is a reverse rotational torque, is zero. Therefore, according to the control method of FIGS. 12(a) through 12(f), a rotational torque larger than that according to the control method of FIGS. 11(a) through 11(f) because of no reverse rotational torque can be obtained. In this example, however, partly since it is necessary to convert magnetic energy to the side of the power amplifier circuit PW in a short time, i.e., within a range of 110 to 120 degrees, and partly since the voltage VS of the power amplifier circuit is limited, the high-speed-side rpm. which enables this control algorithm will be limited.

The current IBE is controlled in the same manner as the current IAD at a timing delayed in phase by 60 degrees from the current IAD, and the current ICF is controlled in the same manner at a timing delayed in phase by 120 degrees from the current IAD. Subsequently, the same controlling is repeated for each phase in accordance with the rotor's rotational angle RA.

The control method of FIGS. 12(a) through 12(f) is advantageous in that no reverse torque will be generated and, as a result, the rotational torque will be increased for the entire motor, but disadvantageous in that the current load of each transistor of the power amplifier circuit PW will be increased as compared to the control method of FIGS. 7(a) through 7(f) and vibration and noise of the motor tend to increase if the current controlling of the speed control system is delayed from an ideal value by the load components of the excitation current and voltage in high-speed rotation.

As an alternative method for supplying energy from the power amplifier circuit to the motor in the high-speed-rotation range, the current IAD may be controlled in such a manner that a current larger than that of FIG. 12(d) will flow as the terminal voltage of the motor is low while the rotor's rotational RA within a range of 60 to 80 degrees and will be decreased before the rotational angle reaches 105 degrees. The same control may be made for the currents IBE, ICF of the remaining phases. At that time, however, the torque ripple will be increased, so vibration and noise will be increased. Because the frequencies of vibration and noise are high in the high-speed-rotation range, practical designing is possible, but depending on the uses.

Figure 13:
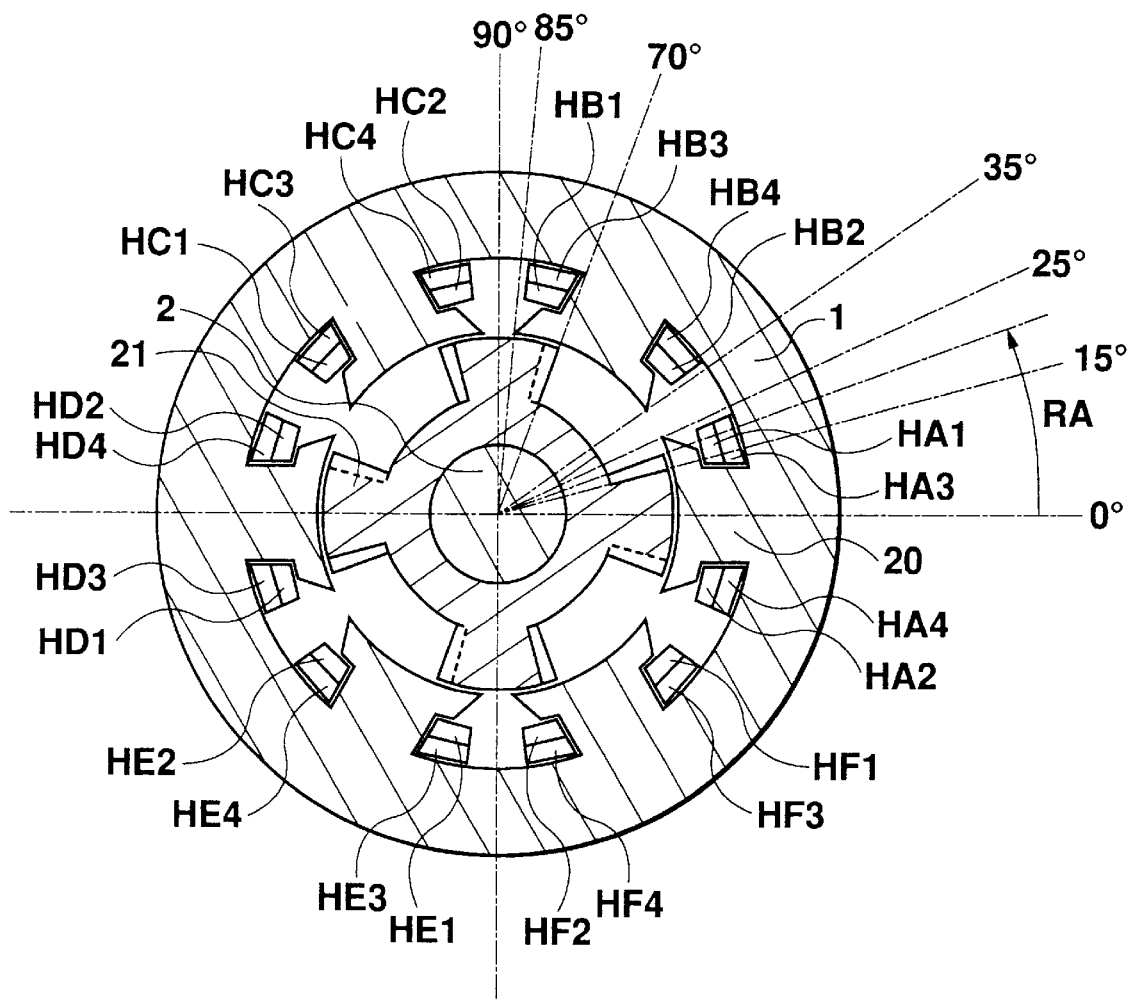
FIG. 13 is a cross-sectional view of still another switched reluctance motor of the present invention.

FIG. 13 shows a further switched reluctance motor according to a fourth embodiment of the present invention.

The motor of this embodiment is differentiated from that of FIG. 1 in that the relationship between the width of the individual rotor salient poles and that of the individual stator salient poles is reversed. Specifically, in the rotor, each salient pole of 30 degrees in width is skewed by 5 degrees and hence has a maximum width, i.e., end-to-end width of 40 degrees. The width of the stator salient poles is 50 degrees.

In the motor of this embodiment, as in that of FIG. 1, it is possible to realize a small torque ripple by varying the current of the torque winding of each stator salient pole while the associated rotor salient pole is located perfectly in or out of confronting relationship with the stator salient pole through its circumferential surface. Further, likewise in the motor of FIG. 1, the torque winding may serve also as the excitation winding.

This motor is advantageous, as compared to motor of FIG. 1, in that the rotor inertia can be minimized and disadvantageous, as compared to the motor of FIG. 1, in that the stator windings are difficult to manufacture due to the shape of the stator salient poles without increasing the inter-turn space of the stator windings.

Figure 14:
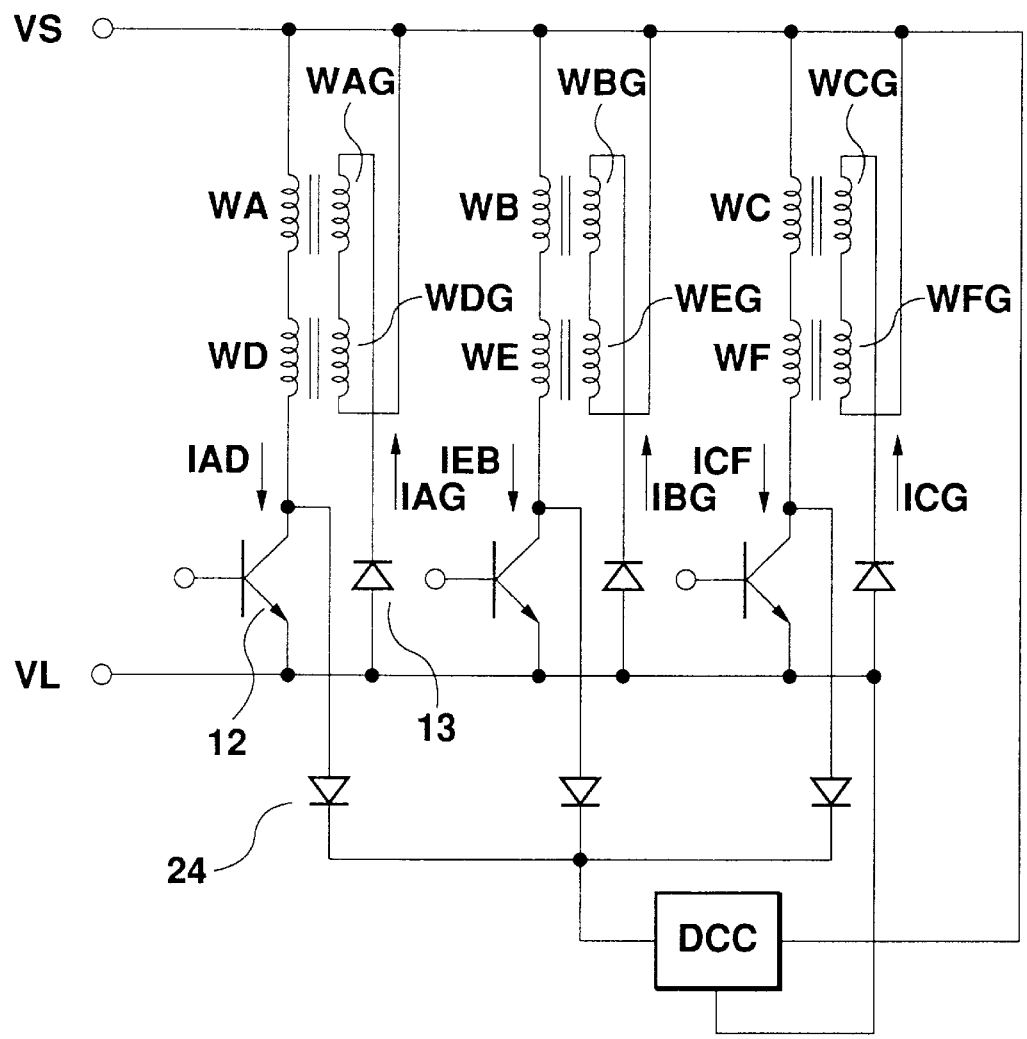
FIG. 14 is a circuit diagram showing windings of and a power amplifier circuit PW of the switched reluctance motor.

FIG. 14 shows the manner in which each of power amplifier circuits of a field-current control section are connected with a respective one of stator windings in a still further switched reluctance motor according to a fifth embodiment of the present invention.

In the motor of this embodiment, pairs of windings WA, WAG; WB, WBG; WC, WCG; WD, WDG; WE, WEG; WF, WFG are mounted round each stator salient pole. The windings of each pair are magnetically coupled.

Figure 15:
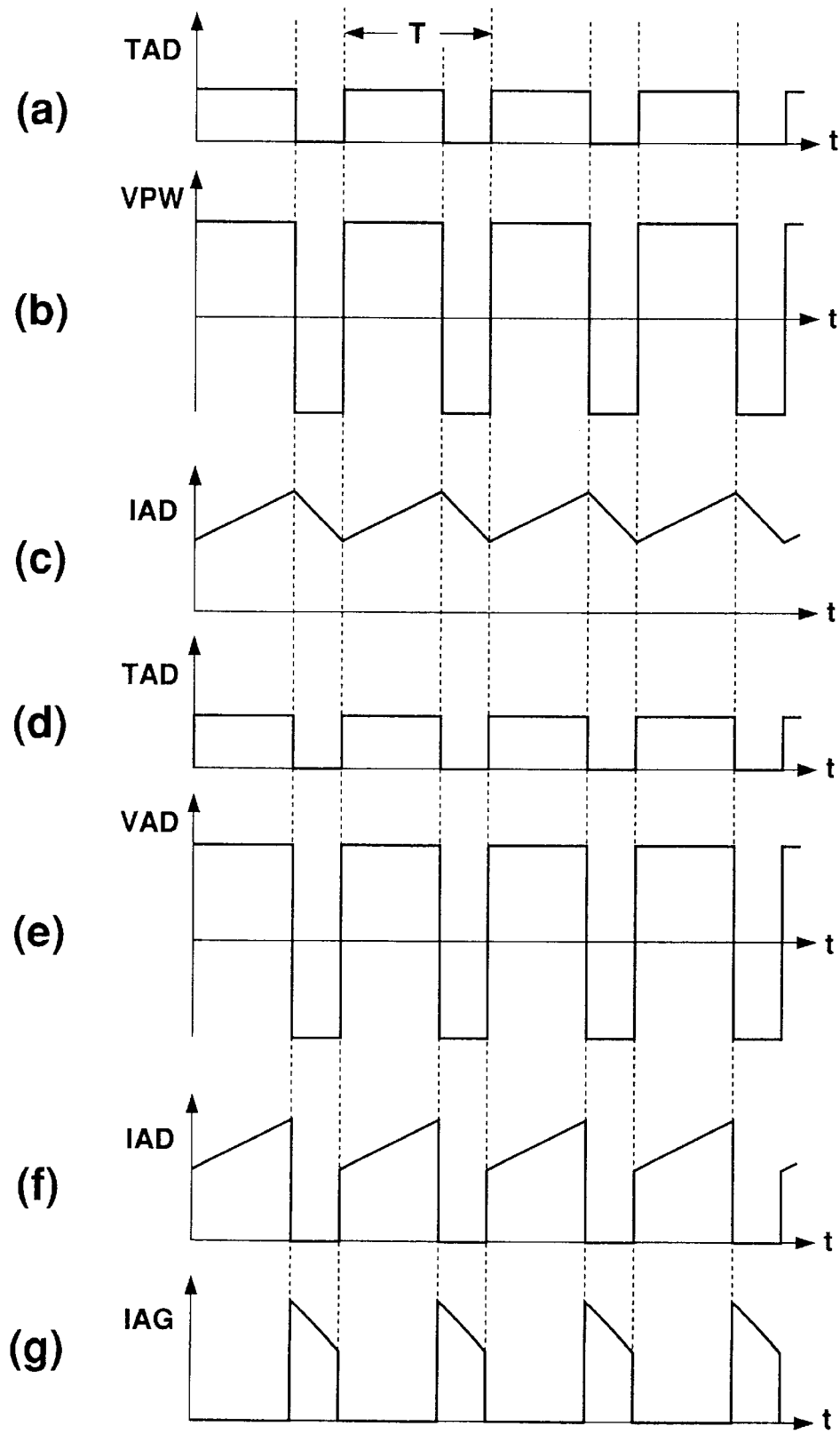
FIGS. 15(a) through 15(g) are control characteristic charts of a control system of the present invention.

FIGS. 15(a) through 15(g) are time charts showing a very part of PWM control operation of the power amplifier section of FIGS. 5 and 14. T stands for a cycle of the control operation. Assuming that the PWM operation is carried out at 10 kHz, the cycle in which each transistor takes an ON-OFF switching action is a very short time of 100 g sec. FIGS. 15(a), 15(b) and 15(c) show one example of the PWM operation of the power amplifier section of FIG. 5; specifically, FIG. 15(a) shows command signals TAD of transistors 8, 9, FIG. 15(b), a voltage VPW to be applied to the windings, and FIG. 15(c), a current IAD controlled in PWM operation. FIGS. 15(d), 15(e), 15(f) and 15(g) show one example of PWM operation of the power amplifier section of FIG. 14; specifically, FIG. 15(a) shows command signals TAD of a transistor 12, FIG. 15(e), a voltage to be applied to the windings, FIG. 15(f), a current IAD controlled in PWM operation, and FIG. 15(g), a current LAG controlled in PWM operation. If the currents IAD, IAG of FIGS. 15(f) and 15(g) are combined, the resulting composite current is equal in value to the current IAD of FIG. 15(c). More specifically, the transistor 12 is rendered to assume the ON state when the current IAD flows in the stator salient poles, and if the transistor 12 is rendered to assume the OFF state when the current IAD is increased, then the current IAD will be zero as the current path will disappear. At the same time, a voltage will be generated also in the windings WAG, WDG and therefore the current IAG will flow via a diode 13. This current is gradually decreased as part of it flows back to the direct-current power sources VS, VL. By repeating this PWM control operation, the currents IAD, IAG are controlled with precision. Subsequently the same control operation is carried out for the remaining phases.

The power amplifier section of FIG. 14 is advantageous, as compared to that of FIG. 5, in that the number of transistors and diodes can be reduced to half to reduce the cost of the control circuit and disadvantageous in that the stator windings are complex to increase their resistance, thus lowering the motor efficiency.

Figure 16:
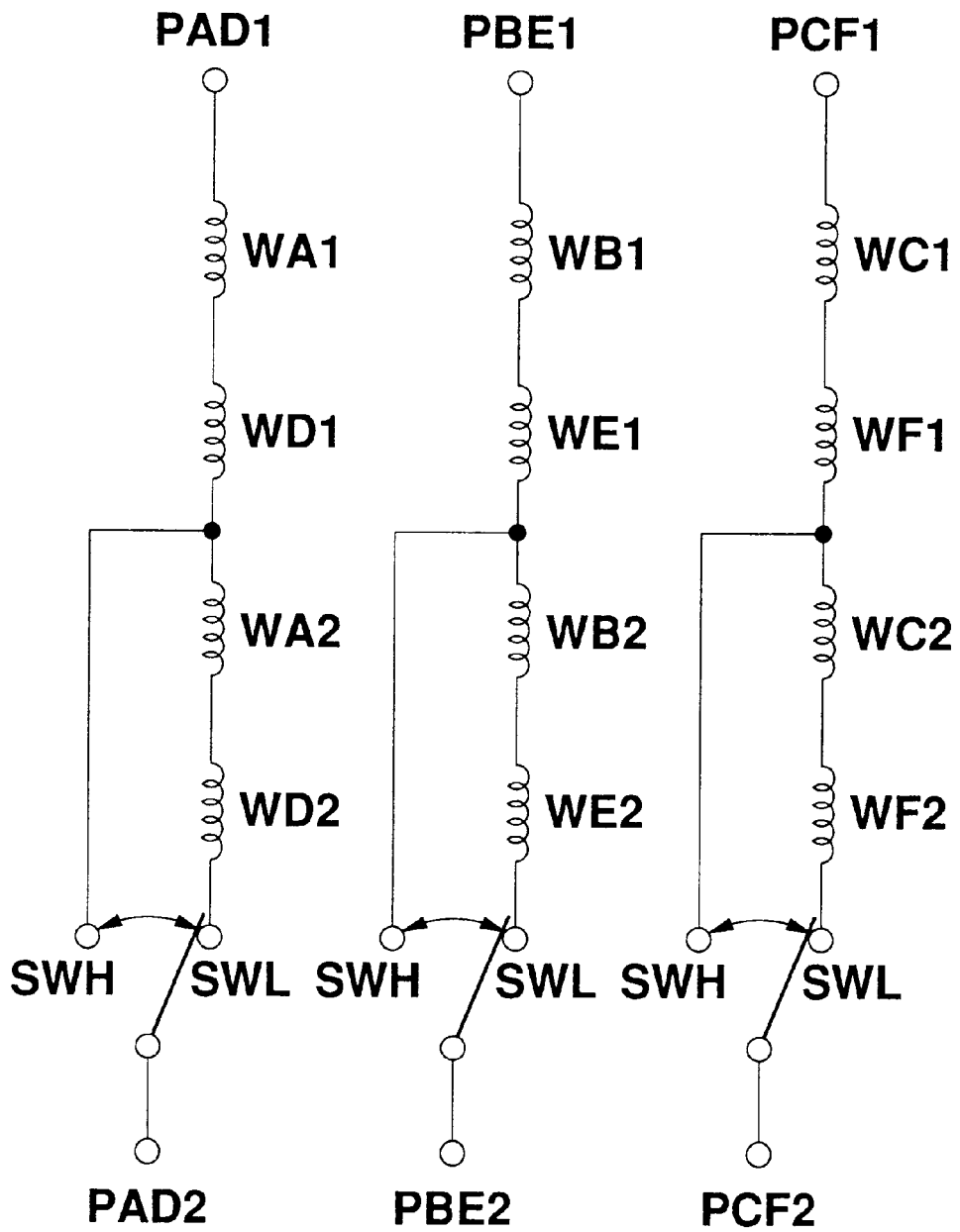
FIG. 16 is a diagram showing the construction of the windings of the switched reluctance motor.

FIG. 16 shows the manner in which the motor windings of FIG. 5 can be divided and connected to selected intermediate portions of the stator windings using switches according to a sixth embodiment of the present invention. In part because the current will flow in every winding during the low-speed rotation and partly since the voltage at the terminal voltage of the motor will be increased during the high-speed rotation, the divided motor winding is connected to the intermediate portions of the stator winding to lower the terminal voltage of the motor so that the current can be supplied simply, thus realizing a high-speed rotational operation. Specifically, as shown in FIG. 16, in internal windings and circuits between terminals PAD1, PAD2 of the motor, the stator windings WAT, WDT of FIG. 5 are respectively divided into two sets, WA1, WA2 and WD1, WD2 and selection can be made between the high-speed-rotation terminal SWH and the low-speed-rotation terminal SWL by the switch. The same operation is carried out for the remaining two phases.

A measure for minimizing the toque ripple in the switched reluctance motor of FIG. 1 will now be described. In the foregoing description, the characteristics of the motor of FIG. 1 is modeled. Actually, however, partly since magnetic fluxes corresponding to the respective magnetic resistances exist in the gaps between the circumferential surfaces and axial surfaces of the rotor salient poles and stator salient poles, and partly since the magnetic characteristics of silicon steel disks of the motor are non-linear magnetic saturation characteristics, there remain torque ripple components that were unable to be eliminated only by the above-mentioned simple theory. The remaining torque ripple components are divided by their respective high-frequency components, and the rotor structure is improved in such a manner that these subdivided torque ripple components cancel one another to reduce the torque ripples. With the assumption that there exist torque ripple components in the cycles TRP1, TRP2, the method in which these torque ripple components are reduced will now be described. The rotor, in the form of a laminate of axially arranged silicon steel disks, is axially divided into quarters RT1, RT2, RT3, RT4. The two quarters RT1 and RT2 are shifted in the direction of rotation by a pitch of TRP1/2, and the two quarters RT3 and RT4 also are shifted in the direction of rotation by a pitch of TRP1/2. The first pair of quarters RT1, RT2 and the second pair of quarters RT3, RT4 are mutually shifted in the direction of rotation by a pitch of TRP2/2. Thus it is theoretically possible to reduce the torque ripples by independently canceling the individual high-frequency components of the torque ripples. Further, non-magnet bodies, such as of stainless steel, may be inserted into each axial interface of the rotor quarters RT1, RT2, RT3 and RT4 so that mutual magnetic couplings can be reduced to minimize the torque ripples more efficiently. Alternatively, instead of dividing the rotor into quarters axially and shifting the rotor quarters in the direction of rotation, the stator may be axially divided into subdivisions and these subdivisions may be shifted in the direction of rotation.

In the first embodiment shown in FIG. 1, the torque ripples are reduced by skewing the rotor. As an effective alternative method, corners of each rotor salient pole, which are spaced apart in the direction of rotation, may be shaped in a polygon or curved to assume a fan shape. A low-torque-ripple characteristic can be realized by combining this alternative with the above-mentioned torque-ripple minimizing measure.

Figure 17:
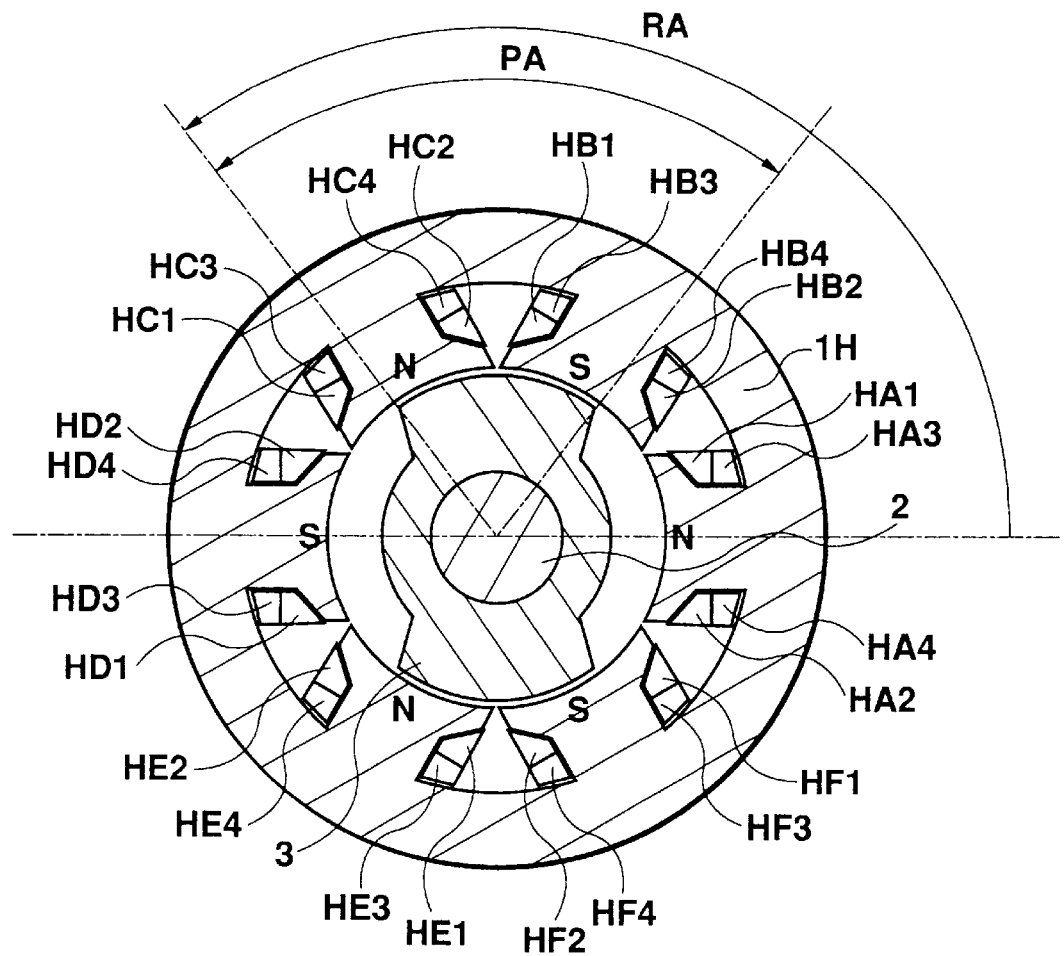
FIG. 17 is a cross-sectional view showing a motor according to another embodiment of the present invention, which is controlled by the control system of the present invention.
Figure 18:
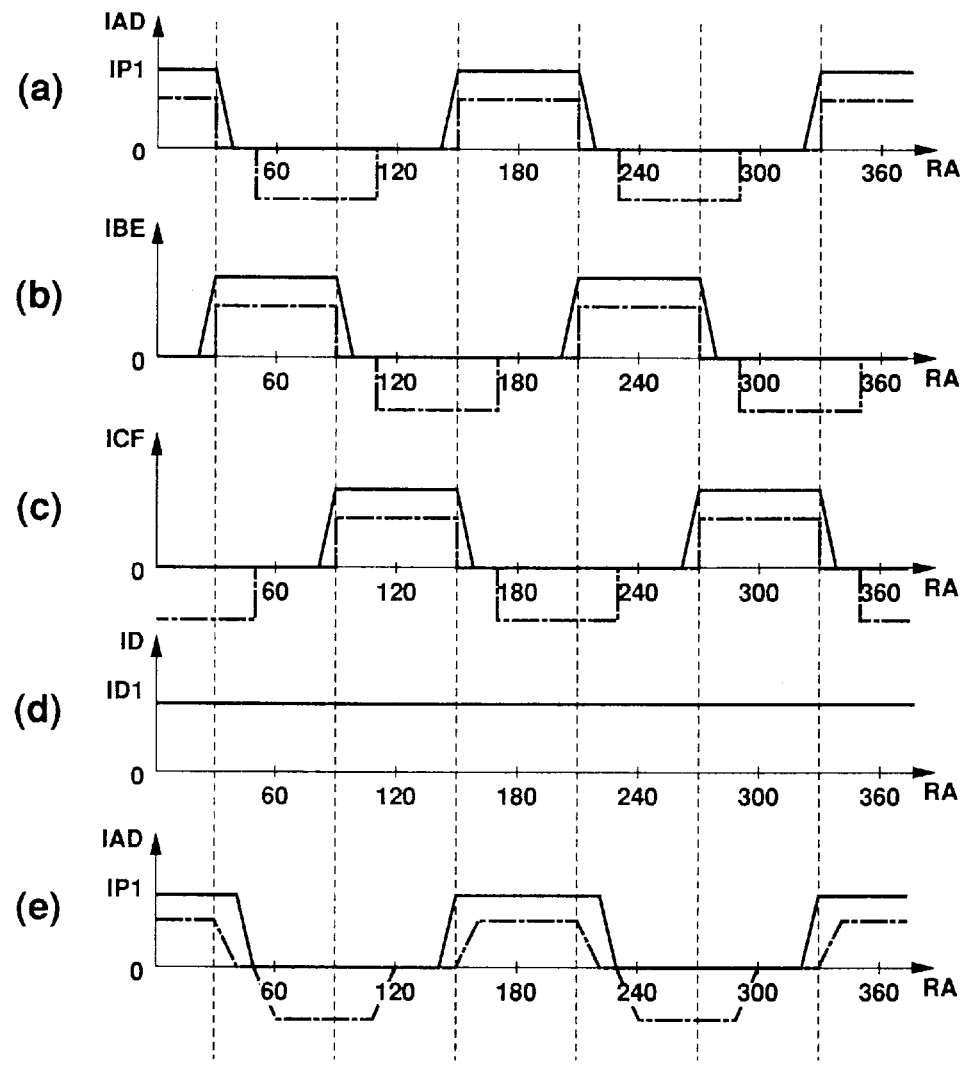
FIGS. 18(a) through 18(e) are control characteristic charts of the control system of the present invention.

FIG. 17 shows an additional switched reluctance motor according to a seventh embodiment of the present invention.

In FIG. 17, 1H designates a stator equipped with six stator magnetic poles each having a width substantially equal to and smaller than 60 degrees in angle of rotation of the rotor. Each of excitation windings indicated by HA3, HA4; HB3, HB4; HC3, HC4; HD3, HD4; HE3, HE4; HF3, HF4 and each of torque windings indicated by HA1, HA2; HB1, HB2; HC1, HC2; HD1, HD2; HE1, HE2; HF1, HF2 are mounted round each stator magnetic pole.

The label 3 designates a rotor equipped with a pair of opposite salient poles having a width substantially equal to and smaller than 80 degrees in angle of rotation of the rotor. As long as the width PA of the rotor salient poles is within a range of 60 to 120 degrees, it is possible to a positive/negative torque at every rotational position. As will also be described below, the limit value of the width of the stator magnetic poles or rotor salient poles can be varied by skewing the rotor or stator.

As the speed control system for the motor, the circuit of FIG. 3 is used.

The relation between the generation of torque and the current of each winding is shown in FIGS. 18(a) through 18(e) and FIGS. 19(a) through 19(e) in terms of characteristics of the individual current value and the rotational angle RA.

The manner in which a counterclockwise torque corresponding to the current amplitude IP1 is continuously generated will now be described. Firstly the value of the excitation current ID is constant ID1 irrespective of the rotational angle RA as shown in FIG. 18(d).

Assuming that the rotational angle RA is gradually increased from zero, namely, the rotor is rotating counterclockwise, the current IAD in the windings WAT, WDT is IP1 and the remaining currents IBE, ICF are zero when RA is zero. When the rotational angle RA is within 0 to 30 degrees, the windings WAT, WDT will generate a torque.

The current IBE in the windings WBT, WET is started increasing when RA reaches 20 degrees and is increased up to IP1 when RA reaches 30 degrees. During that time, since the rotor salient pole has not yet reached the associated stator magnetic pole of the windings WBT, WET, no torque will be generated, which is a preparatory operation for subsequent torque generation.

When the rotational angle RA is within a range of 30 to 90 degrees, the windings WBT, WET will generate a torque. Simultaneously, within a range of 30 to 40 degrees, the current IAD will be described from IP1 to zero. During that time, since the stator magnetic pole round which the windings WAT, WDT are mounted is located in confronting relation with the associated rotor salient pole through its entire surface, nothing will basically be contributed to generation of a torque.

Within a range of 80 to 90 degrees, the current ICF flowing in the windings WC, WF is increased from zero to IP1 to make it ready to generate a torque, and within a range of 90 to 150 degrees a torque is generated due to the current ICF. Simultaneously, within a range of 90 to 100 degrees, the current IBE is increased from IP1 to zero.

Subsequently, as the individual current flows in the corresponding windings, a counterclockwise constant torque with less torque ripples can be continuously generated.

In each of characteristic charts of FIGS. 18(a) through 18(e), broken lines indicate the induction voltage commensurate with variation of the magnetic flux crossing each winding of the motor. Accordingly, the amplitude of the induction voltage is proportional to the rotational speed. A voltage drop due to the variation of any possible leak magnetic flux of the windings and the winding resistance may be neglected. Of the induction voltages indicated by broken lines in FIGS. 18(a) through 18(e), the induction voltage while the current in each phase flows may be treated as the voltage feedforward signal IADS, IBES, ICFS. Also a signal corresponding to the induction voltage in the range where no current flows may be added to the voltage feedforward signal; although the necessity of a voltage feedforward signal corresponding to a negative voltage depends on the circuit type, such a voltage feedforward signal is usually not necessary. In order for more accurate control, the voltage component corresponding to the variation of leak magnetic flux of each winding and the dropped voltage component of the winding resistance also may be added to these induction voltage signals to create a voltage feedforward signal.

Since the width of the stator magnetic poles is 60 degrees and the width of the rotor salient poles is 80 degrees, it is possible to expand the period of flow of current by quickening the front rise of current by, for example, approximately 5 degrees and delaying the back rise of current by, for example, approximately 5 degrees, so that the torque to be generated by the motor will be constant. In view of increasing necessity of varying the current at high speed during the high-speed rotation, expansion of the period of flow of current is effective in securing a time margin in current control. By widening the width of the stator magnetic poles by, for example, approximately 90 degrees, it is possible to increase the time margin in current control. However, limitless expansion of the period of current flow would increase copper loss from the motor so that efficient operation of the motor can not be achieved.

Consequently, for reducing the loss of the motor and thereby increasing the output of the motor instead, it is preferable to minimize the period of flow of current with the current control's time margin being set as the limit. Specifically, as shown in the characteristic charts of FIGS. 18(a) through 18(e), one effective method is to reduce the period of flow of current during the low-speed rotation and to expand the period of flow of current with the increase of rpm. to such an extent that a time margin in current control can be obtained.

If the current, like the current IBE in the windings WBT, WET while RA is within a range of 20 to 30 degrees, flows in the windings while no torque is generated, magnetic energy will be accumulated and, soon after that, part of the accumulated magnetic energy will be converted into rotational energy, thus increasing the driving efficiency of a drive system.

Figure 19:
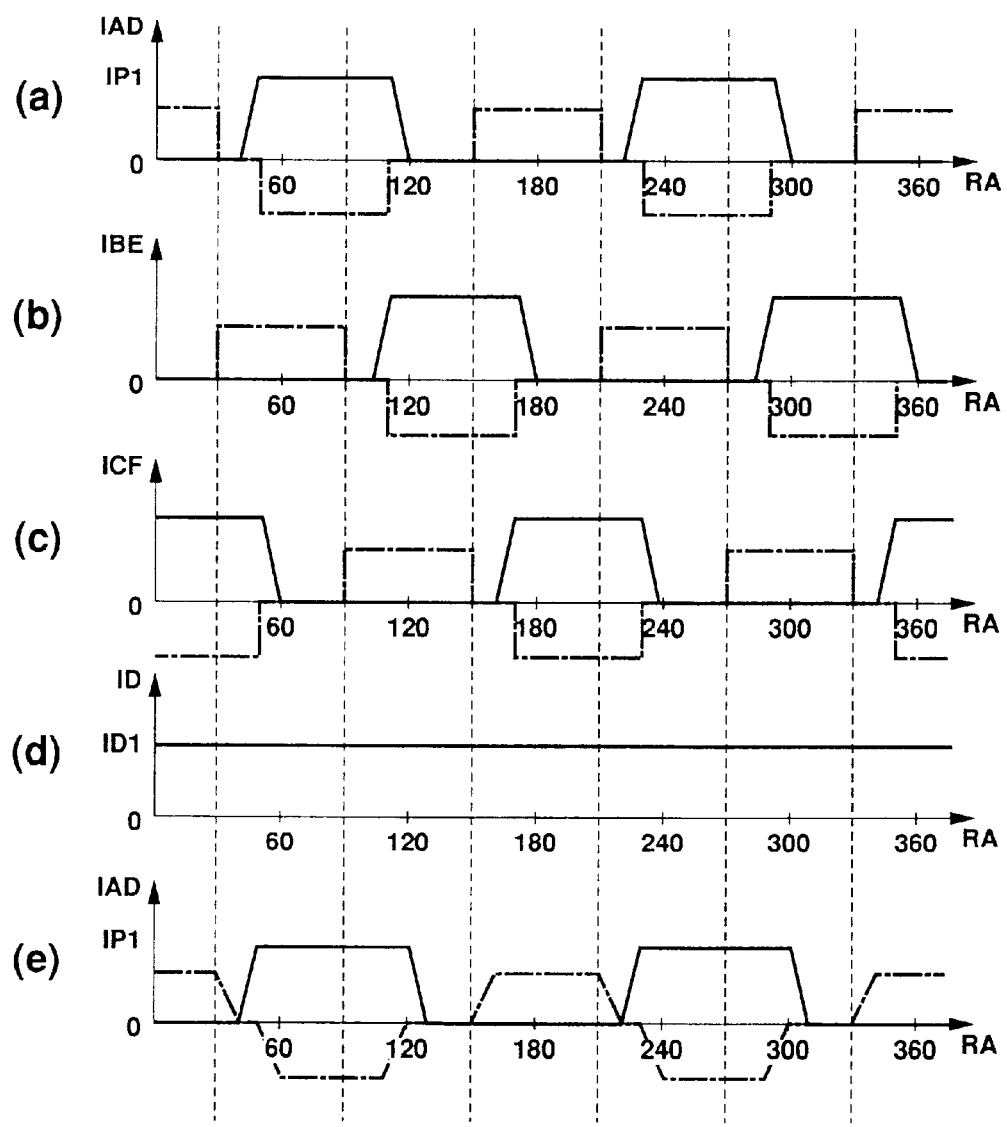
FIGS. 19(a) through 19(e) are control characteristic charts of the control system of the present invention.

The manner in which a clockwise torque corresponding to the current IP1 is continuously generated will now be described. Firstly the excitation current ID is constant as ID1, irrespective of the rotational angle RA, as shown in FIG. 19(d).

Assuming that the rotation angle RA is gradually increased, the current ICF is IP1 of the windings WCT, WFT when RA is zero, and the remaining two currents IAD, IBE are zero. While RA is within a range of 0 to 50 degrees, the windings WCT, WFT generates a torque.

The current IAD in the windings WAT, WDT begins increasing when RA reaches 40 degrees and is increased to IP1 when RA reaches 50 degrees. During that time, since the stator magnetic pole round which the windings WAT, WDT are mounted is located in confronting relation with the associated rotor salient pole through its entire surface, nothing will basically be contributed to generation of a torque. This is a preparatory operation for subsequent torque generation.

The windings WHT, WDT generates a torque while RA is within a range of 50 to 110 degrees. During that time, when RA is 50 to 60 degrees, the windings WCT and WFT do not generate a significant torque because the stator magnetic pole around which the winding WCT, WFT are mounted is not located in a perfect confronting relationship with the associates rotor salient pole.

The current IBE flowing in the windings WBT, WET is increased from zero to IP1 while RA is within a range of 100 to 110 degrees, which makes it ready to generate a torque, and a torque is generated due to the current IBE while RA is within a range of 110 to 170 degrees. And the current IAD is decreased from IP1 to zero while RA is within a range of 110 to 120 degrees.

Subsequently, as the individual current flows in the corresponding windings, a counterclockwise constant torque with fewer torque ripples can be continuously generated.

In charts FIGS. 19(a) through 19(e), broken lines indicate the induction voltage commensurate with variation of the magnetic flux crossing each winding of the motor. Accordingly, partly since a power is the product of a positive current and a negative voltage, and partly since a clockwise torque is generated while the rotor is in counterclockwise rotation, the motor generates electric energy to perform regeneration. The amplitude of this induction voltage is proportional to the rotational speed. A voltage drop due to the variation of any possible leak magnetic flux of the windings and the winding resistance is neglected. Of the induction voltages indicated by broken lines in FIGS. 19(a) through 19(e), the induction voltage while the current in each phase flows may be treated as the voltage feedforward signal VAD, VBE, VCF.

The characteristics shown in FIGS. 19(a) through 19(e), as described in connection with the operation when the counterclockwise torque is generated, are such that the period of flow of current can be expanded. The characteristics must depend on the width of the rotor salient poles.

The generation of torque is associated with the current in each phase and the rotational position, but is not associated with the rotational direction and the rotational speed.

There exists a range of rotational angles RA such that the stator magnetic pole is located perfectly in or out of confronting relationship with the entire circumferential surfaces of the associated rotor salient pole, namely, no induction voltage of each windings is generated. By varying the current of the torque windings using this range of rotational angle, it is for example possible to perform current control with less torque ripples.

The current control in which the subdivisions of the rotor as shown FIG. 17 are individually skewed in the directional of rotation by 10 degrees will now be described. Skewing of the rotor or stator minimizes torque ripples originating from the gap between adjacent stator magnetic poles. The voltage feedforward signal indicated by broken lines in FIGS. 18(a) through 18(e) and 19(a) through 19(e) has a rectangular waveform because the rotor salient poles are located perfectly in confronting relationship with the stator magnetic poles through their entire circumferential surfaces when they reaches the stator magnetic poles so that the magnetic flux varies stepwise. Skewing minimizes both vagueness of signal in the interface regions where the voltage feedforward signal varies with respect to the rotor's rotational angle RA in a rectangular waveform and difficulty of instantaneously varying the voltage of the power.

FIG. 18(e) is a chart showing the current IAD and the induction voltage in the windings when a counterclockwise torque is generated as the rotor skewed by 10 degrees is rotated in counterclockwise. Assuming that the rotor is skewed by 10 degrees, the rate of variation of the magnetic flux is increased linearly as the area of the confronting circumferential surfaces gradually increases when the skewed circumferential part of the rotor reaches the stator magnetic poles, and the rate of variation of the magnetic flux is kept constant after the stator magnetic poles have passed the skewed parts of the rotor. As a result, the voltage signal varying stepwise can be changed into a trapezoidal waveform by gradually varying the voltage feedforward signal, thereby minimizing vagueness of signal in the interface region and difficulty of sudden variation of the voltage. The higher the rate of rotation, the larger the result can be obtained.

If the current IAD is varied in the region where no induction voltage of the windings is generated, influence on the torque due to the current variation is small. Consequently varying the current around the region where an effective voltage will be generated would suffice.

One phase in which the current IAD flows has been described. The remaining two phases are delayed by 120 degrees and 240 degrees, respectively, with respect to the rotor's rotational angle RA, and the control operation for these remaining phases is identical with that for the first-named phase.

FIG. 19(e) is a characteristic chart showing the current IAD and the induction voltage in the windings when a clockwise torque is generated as the rotor skewed by 10 degrees is rotated in counterclockwise. Similarly, the voltage signal can also be changed into a trapezoidal waveform, and the difficulty of current control can be minimized. The remaining two phases are delayed by 120 degrees and 240 degrees, respectively, with respect to the rotor's rotational angle RA, and the control operation for these remaining phases is identical with that for the first-named phase.

Figure 20:
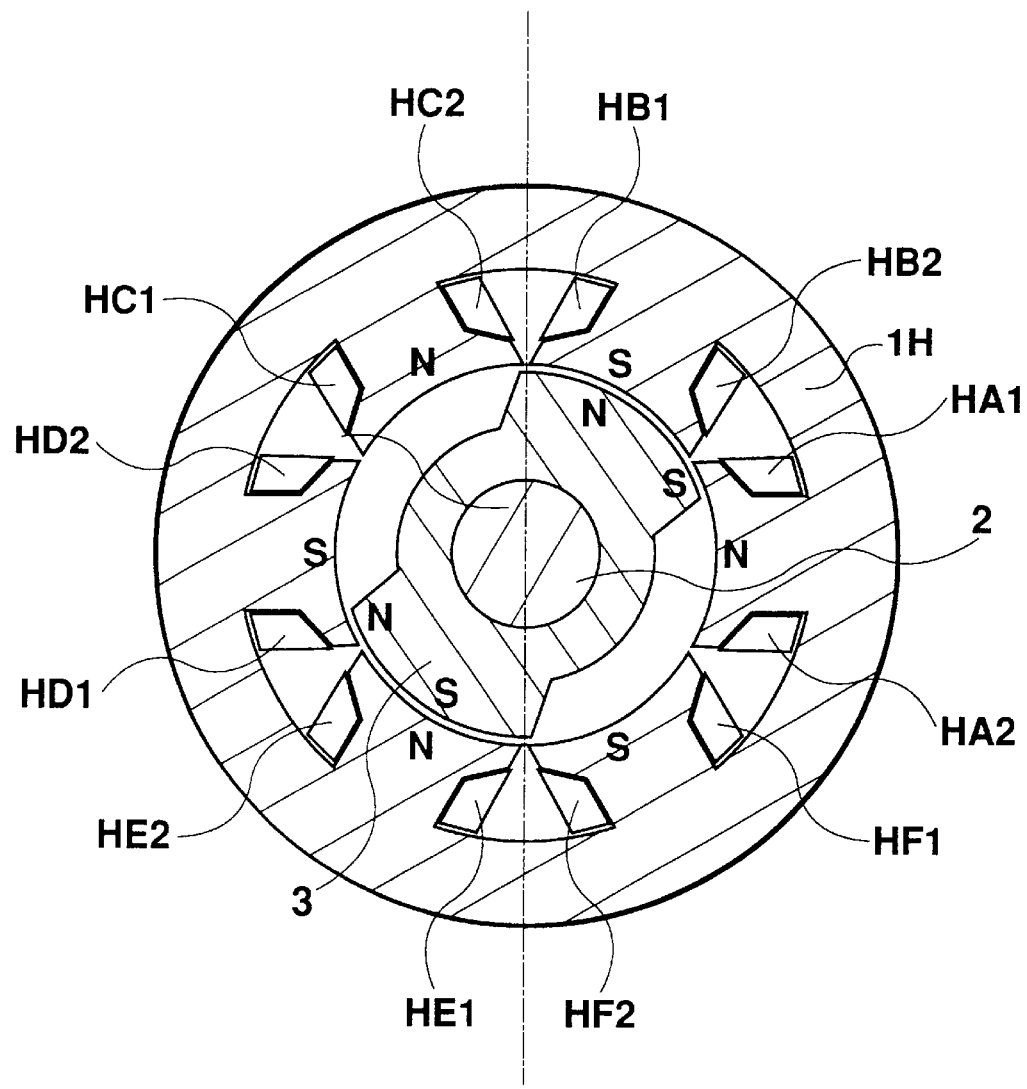
FIG. 20 is a cross-sectional view showing another motor, which is according to still another embodiment, to be controlled by the control system of the present invention.

FIG. 20 shows another switched reluctance motor according to an eighth embodiment of the present invention.

The motor of this embodiment differs from the motor of FIG. 17 in that a common winding serves as both an excitation winding and a torque winding in the stator. In this embodiment, a value which is the sum of the excitation current ID and each torque current, is controlled as a common winding current of each phase.

Figure 21:
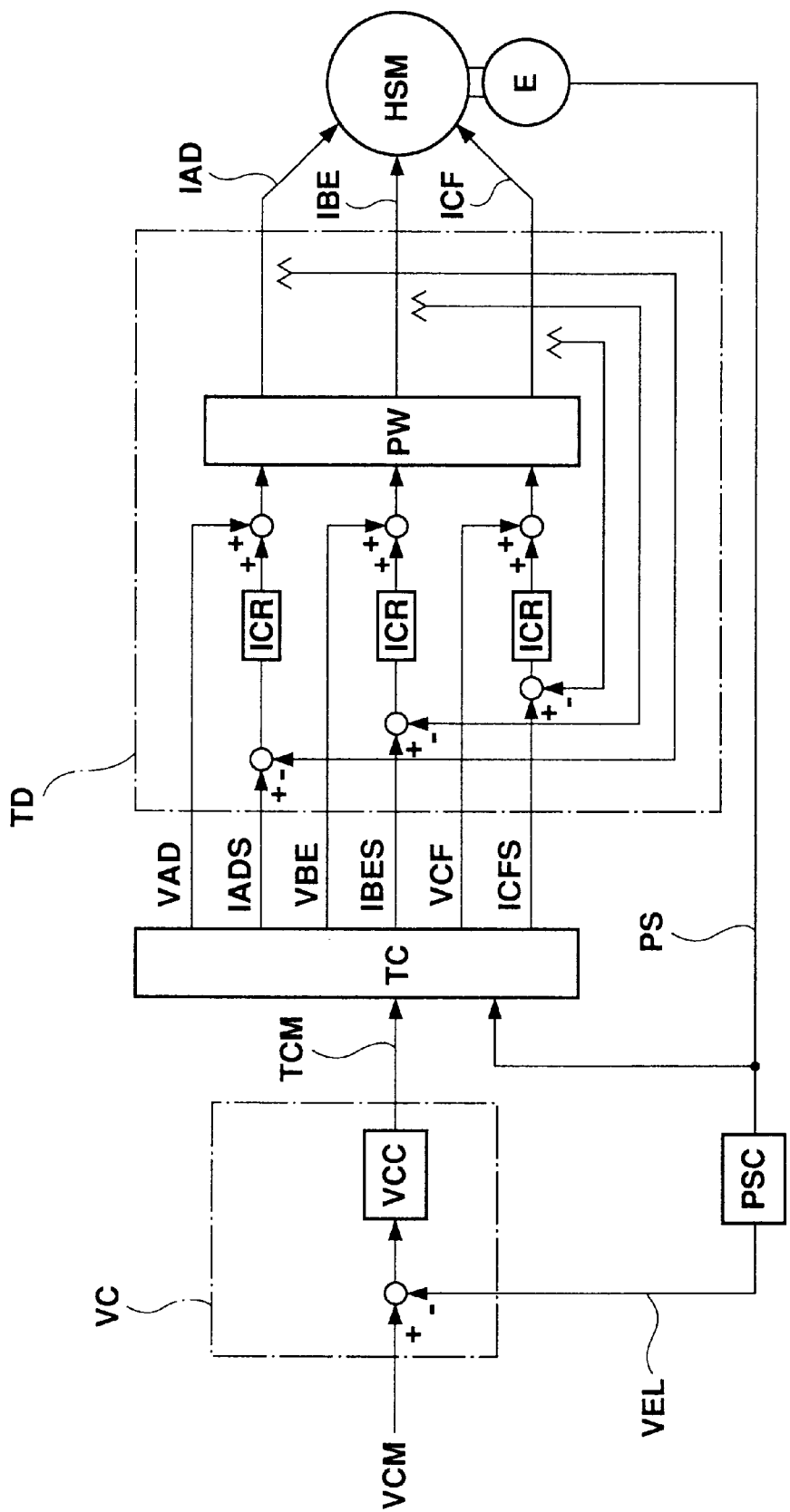
FIG. 21 is a block diagram showing a motor control system according to another embodiment of the present invention.

FIG. 21 shows a speed control system for this motor identical with that shown in FIG. 3, except that no field-current control section is included.

Figure 22:
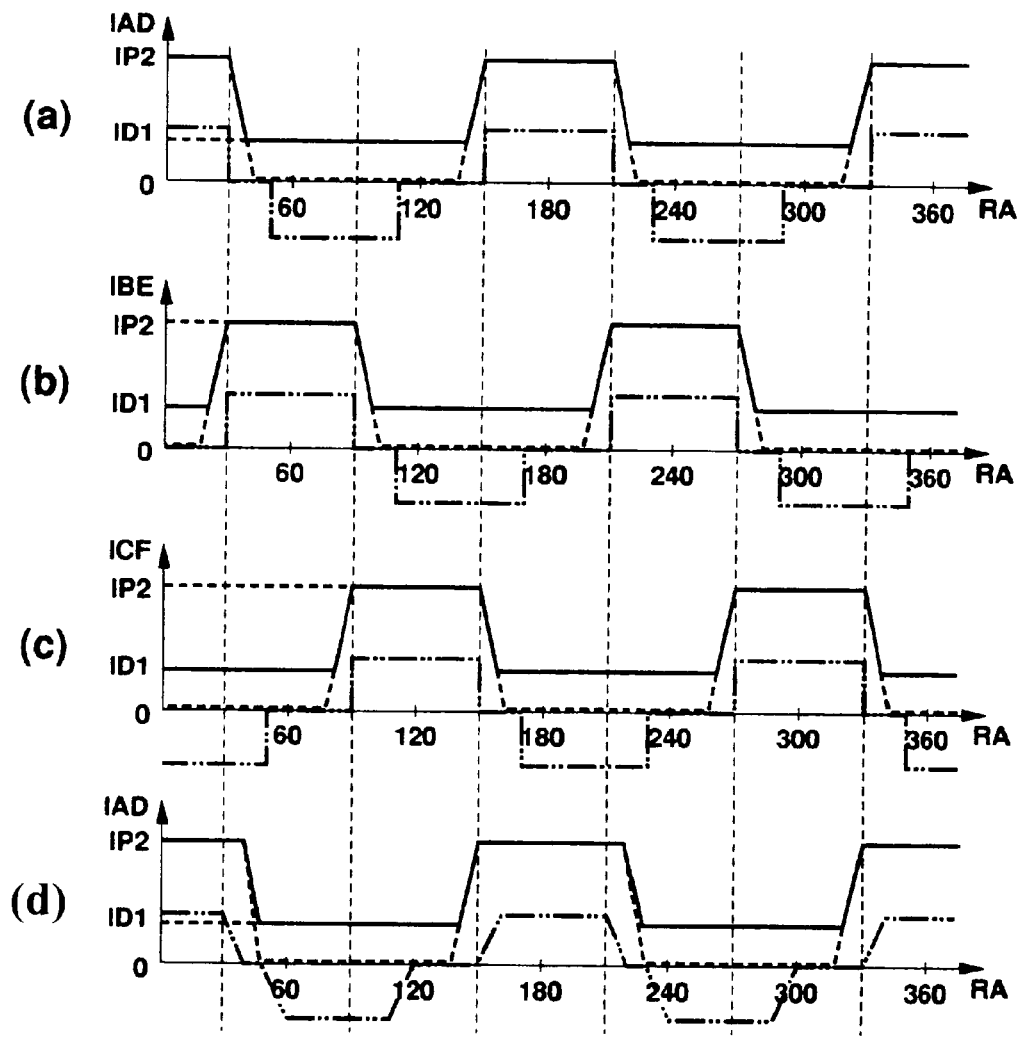
FIGS. 22(a) through 22(d) are control characteristic charts of the control system of the present invention.
Figure 23:
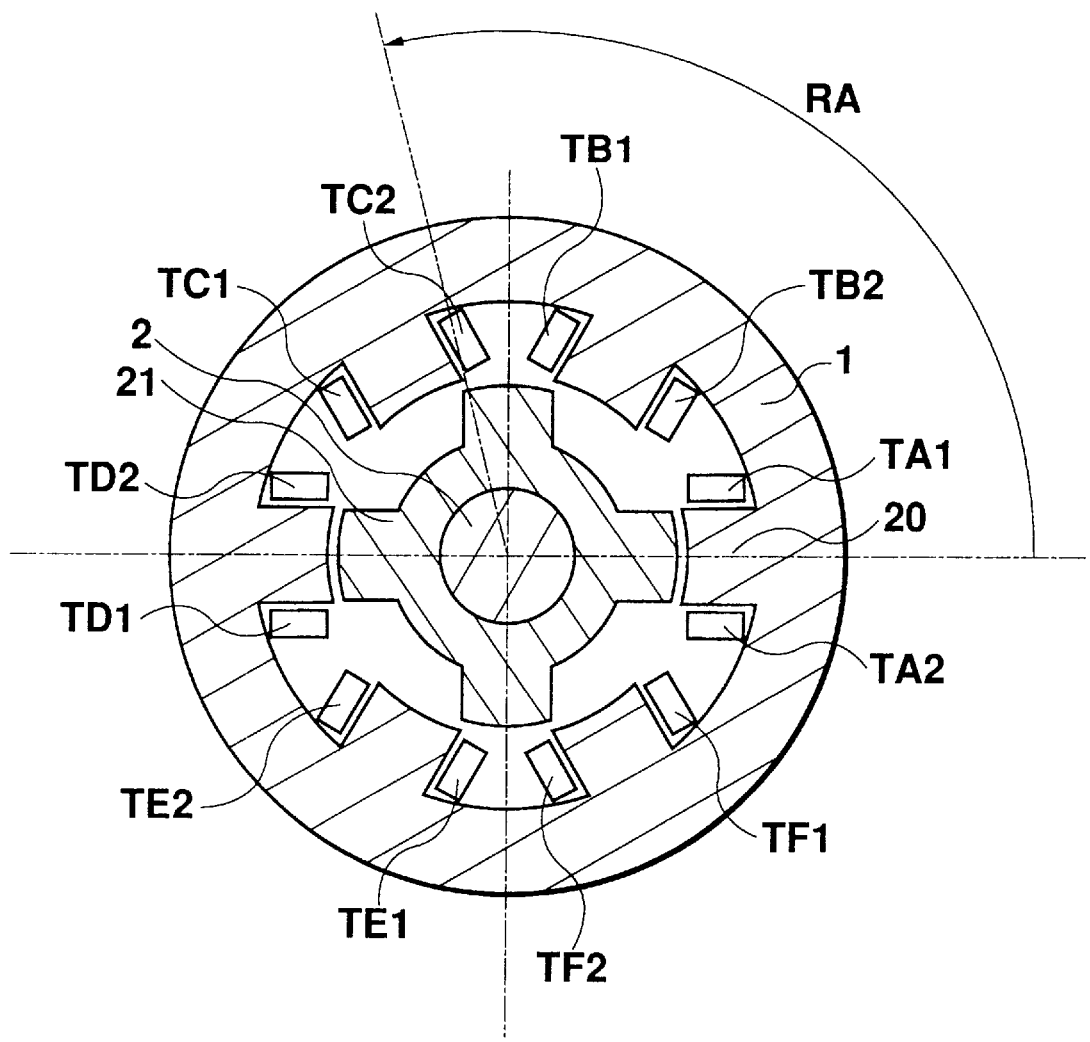
FIG. 23 is a cross-sectional view of a conventional switched reluctance motor.

The relationship between generation of torque and current of each winding is shown in a characteristic chart of FIG. 22 in terms of the current value with respect to the rotational angle RA.

The manner in which a counterclockwise torque corresponding to the current amplitude IP1 is continuously generated will now be described. Assuming that the rotational angle RA is gradually increased, in other words, the rotor is rotating counterclockwise, the current IAD of the windings WAT, WDT is IP2 and the remaining currents IBE, ICF are ID1, as shown in FIG. 22(a). The value IP2 corresponds to the sum of the excitation current ID1 and the torque current IP1 as shown FIG. 18. While the RA is within a range of 0 to 30 degrees, the windings WAT, WDT generates a torque.

The current IBE of the windings WBT, WET begins increasing when RA reaches 20 degrees, and the current value is increased to IP2 when RA reaches 30 degrees. Within this range, the rotor salient pole has not yet reached the associated stator magnetic pole of the windings WBT, WET, so no torque is generated.

When RA is within a range of 30 to 90 degrees, the windings WBT, WET generates a torque. Within a range of 30 to 40 degrees, the current IAD is decreased from IP2 to ID1. At that point, since the stator magnetic pole round which the windings WAT, WDT are mounted is located in confronting relationship with the rotor salient pole through its entire circumferential surfaces, basically no torque will be generated. Within a range of 80 to 90 degrees, the current ICF flowing in the windings WCT, WFT is increased from ID1 to IP2 to make it ready to generate a torque, and within the range from 90 to 150 degrees the current ICF generates a torque. Within a range of 90 to 100 degrees, the current IBE is decreased from IP2 to ID1.

Likewise, with each current flowing, a counterclockwise constant torque with less torque ripples can be continuously generated. The polarity of the rotor salient pole depends on the polarity of the associated stator magnetic pole. The distribution of the polarities of the rotor salient poles is shown in FIG. 20 and is varied with rotation of the rotor.

In each of FIGS. 22(a) through 22(d), broken lines indicate induction voltages with variation of magnetic flux crossing each winding of the motor. Accordingly, the magnitude of the induction voltage is proportional to the rotational speed. And a voltage drip due to the variation of leak magnetic flux of the winding and the winding resistance is neglected. The induction'voltages indicated by broken lines in FIG. 22 are also voltage feedforward signals VAD, VBE, VCF of the individual phases. To achieve more accurate control, the voltage component corresponding to the variation of leak magnetic flux of each winding and the dropped voltage component of the winding resistance also may be added to these induction voltage signals to create a voltage feedforward signal.

Alternative control methods will now be described.

In FIGS. 22(a), 22(b) and 22(c), the excitation current ID1 may be zero as indicated by dot lines. In such event, since excitation current is zero, the induction voltage indicated by broken (two dot) lines will necessarily be zero. In this alternative, a larger torque can be generated than the current value indicated by solid lines in FIGS. 22(a), 22(b) and 22(c). The torque to be obtained by the excitation magnetic current ID1 is the energy component of a characteristic of electromotive force H and magnetic flux density B, being half the torque to be obtained by the torque current with respect to the same current value.

At that time, the voltage feedforward signal IADS, IBES, ICFS is the signal indicated by broken lines in FIGS. 22(a), 22(b) and 22(c). The voltage feedforward signal corresponding to the induction voltage component indicated by dash-and-two-dot lines is not necessary.

The motor of FIG. 20 and the control characteristics of FIGS. 22(a), 22(b) and 22(c) will now be described from an energy point of view, with preconditions that the narrowest of the magnetic-flux-pass portion between the stator magnetic poles and the rotor salient poles is excited at substantially saturation magnetic flux density by excitation current ID1, and that the magnetic characteristic of electromotive force H and magnetic flux density B of the silicon steel disks constituting each of the stator magnetic poles and rotor salient poles is such that the magnetic flux density B increases linearly with the increase of the electromotive force H and is substantially constant if it is over saturation magnetic flux density.

If the current values of the individual phases are as indicated by solid lines in FIGS. 22(a), 22(b) and 22(c), the power P1 to be supplied from the control system of FIG. 21 to the motor is as expressed by Equation 1 as the phase of the current IAD acts at an angular point, e.g., the rotor's rotational angle RA=180 degrees.

$$P1 = (IP2) \times (\text{induction voltage } VA) = (IP1 + ID1) \times (\text{induction voltage } VA) \quad \text{[Equation 1]}$$

Of P1, (IP1)×(induction voltage VA) and ½ of (ID1)×(induction voltage VA) is the mechanical energy to be outputted as a torque. The remaining ½ of (ID1)×(induction voltage VA) is the magnetic energy inside the motor which is to be supplied from the drive system of FIG. 21 into the motor.

In the meantime, the power P2 to be supplied from the motor back to the drive system of FIG. 21 is as expressed by Equation 2 as the phase of the current ICF acts.

$$P2 = -(ID1) \times (\text{induction voltage } VA) \quad \text{[Equation 2]}$$

½ of P2 is the mechanical energy to be supplied back to the drive system of FIG. 21 as a rotational torque and a reverse torque, and the remaining ½ of P2 is supplied from inside the motor back to the drive system of FIG. 21.

As a result, the mechanical output power P3 of the motor can be expressed by Equation 3.

$$P3 = P1 - P2 = (IP1) \times (\text{induction voltage } VA) \quad \text{[Equation 3]}$$

In FIGS. 22(a), 22(b) and 22(c), in the range where the current value of each phase is an excitation current ID1, the current value may be zero as indicated by dotted lines. The motor of FIG. 20 and the control characteristics of FIGS. 22(a), 22(b) and 22(c) will now be described from an energy point of view. If the current values of the individual phases are as indicated by solid lines in FIGS. 22(a), 22(b) and 22(c), the power P1 to be supplied from the control system of FIG. 21 to the motor is as expressed by Equation 4 as the phase of the current IAD acts at an angular point, e.g., the rotor's rotational angle RA=180 degrees.

$$P1 = (IP2) \times (\text{induction voltage } VA) = (IP1 + ID1) \times (\text{induction voltage } VA) \quad \text{[Equation 4]}$$

Of P1, (IP1)×(induction voltage VA) and ½ of (ID1)×(induction voltage VA) is the mechanical energy to be outputted as a torque. The remaining ½ of (ID1)×(induction voltage VA) is the magnetic energy inside the motor which is to be supplied from the drive system of FIG. 21 into the motor.

In the meantime, the power P2 to be supplied from the motor back to the drive system of FIG. 21 is nil partly since the current ICF is zero and partly since-no excitation current flows, namely, the induction voltage is zero, causing no energy to be input or output.

As a result, the mechanical output power P3 of the motor can be expressed by Equation 5.

$$P3=P1-(ID1)\times(\text{induction voltage } VA)\times\tfrac{1}{2}-P2=P1-(ID1)\times(\text{induction voltage } VA)\times\tfrac{1}{2}=(IP1+ID1/2)\times(\text{induction voltage } VA) \quad \text{[Equation 5]}$$

Of P1, ½ of (ID1)×(induction voltage VA) is the magnetic energy inside the motor which does not contribute to output torque.

The motor of FIG. 20 is advantageous in that the windings are simplified as compared to the motor of FIG. 17 and that the control circuit does not require the excitation circuit of FIG. 4 and is hence simplified and disadvantageous in that the voltage of the motor terminals during the high-speed rotation is higher as compared to the motor of FIG. 17 to increase the load of the current control section and that only the excitation current component of the motor current is increased to necessitate increasing the current capacitance of the current control section. Accordingly, since the motor of FIG. 17 and the motor of FIG. 20 have merits and demerits depending on the rpm. and output power, the motor of FIG. 3 is usually advantagous during high-speed rotation or when the output power is large.

Current control with the rotor of FIG. 20 skewed in the direction of rotation by 10 degrees will next be described. When the rotor is tilted by 10 degrees, the rate of variation of the magnetic flux is increased linearly as the area of the confronting circumferential surfaces gradually increases when the skewed circumferential part of the rotor reaches the stator magnetic poles, and the rate of variation of the magnetic flux is kept constant after the stator magnetic poles have passed the skewed parts of the rotor. As a result, the voltage signal varying stepwise can be changed into a trapezoidal waveform by gradually varying the voltage feedforward signal, thereby minimizing vagueness of signal in the interface region and difficulty of sudden variation of the voltage.

FIG. 22(d) shows a specific control characteristic for the phase of current IAD. The induction voltage is a characteristic indicated by broken lines in FIG. 22(d). As described above, the current IAD indicated by solid lines maybe changed to that indicated by dotted lines, in which event the induction voltage indicated by broken (two dot) lines is zero.

The remaining two phases of current IBE, ICF are delayed by 120 degrees and 240 degrees, respectively, with respect to the rotor's rotational angle RA, and the control operation for these remaining phases is identical with that for the first-named phase.

Various modifications and changes to the foregoing switched reluctance motors and control systems are possible.

For example, each arithmetic section illustrated as an example of the control system of FIG. 3 may be substituted by a micro processor and a memory for storing a control pattern so that the same control can be realized. Other alternatives are fuzzy control and neural-net-memory control.

The method of detecting the rotational position of the rotor may be sensorless and not empty.

In controlling the high-speed rotation of the motor, the excitation current may be weakened, namely, the intensity of field may be weakened, enabling a wide selection of applications.

The number of the stator magnetic poles and that of the rotor salient poles may be decreased to 3 and 2, respectively, or increased.

Although in certain described embodiments, the rotor is skewed, alternatively, the stator may be skewed. The rotor may be axially divided into several parts shifted at a small pitch in the direction of rotation with the same result as skewing.

Further, the control mode may be automatically switched to meet the more suitable of the rotational conditions of the motor. This alternative method is exemplified by a method of switching the control algorithm between the low-speed rotation and the high-speed rotation and a method of gradually transferring from the low-speed rotation to the high-speed rotation and vice versa.

According to the switched reluctance motor and control system of the present invention, it is possible to minimize torque ripples, thus realizing a drive system with less vibration and noise. To control the three-phase induction motor, common power amplifier sections usually require six transistors and six diodes. However, in the present invention, only three transistors and three diodes are required so that an inexpensive control system can be realized and a higher-speed-rotation drive can be achieved. Further, because of the torque-ripple-minimizing measure, it is possible to more silently drive motors at high speeds.

What is claimed is:

1. A motor control system for controlling a motor, which includes six stator magnetic poles each having a width substantially equal to or less than 60 degrees in terms of angle of rotation of a rotor, excitation windings mounted one round each of the stator magnetic poles, torque windings mounted one round each stator magnetic pole, and two rotor salient poles each having a width ranging from 60 degrees to 120 degrees in terms of angle of rotation of the rotor, said system comprising:

(a) an excitation drive circuit adapted to connect said excitation windings in series for supplying a direct-current-exciting current to each excitation winding to excite the motor in accordance with an excitation command signal; and (b) a torque-current drive circuit for causing, when a torque command is positive, a current having a magnitude in accordance with the torque command to flow in the torque winding of the stator magnetic pole at which a counterclockwise end of the associated rotor salient poles and for causing, when the torque command is negative, said current to flow in the torque windings of the stator magnetic pole at which a clockwise end of the associated rotor salient poles.

2. A motor control system according to claim 1, wherein when the torque command is positive while the rotor is rotating counterclockwise, a torque current in the torque winding on each stator magnetic pole is controlled in such a manner that said torque current is increased while the counterclockwise end of each rotor salient pole is located counterclockwise of the clockwise end of the associated stator magnetic pole and that said torque current in the torque winding on each stator magnetic pole is decreased while the clockwise end of the rotor salient pole is located counterclockwise of the counterclockwise end of the associated stator magnetic pole, and wherein, when the torque command is negative while the rotor is rotating counterclockwise, said torque current is controlled in the torque winding on each stator magnetic pole in such a manner that said torque current is increased while each stator magnetic pole is located within a width of the associated rotor salient pole and that said torque current is decreased while none of the stator magnetic poles are located in confronting relationship with any of the rotor salient poles throughout their circumferential surfaces.

3. A motor control system for controlling a motor, which includes a rotor having two salient poles each having a width ranging from 60 to 120 degrees in terms of angle of rotation of the rotor, a stator surrounding the rotor, the stator having six stator magnetic poles each having a width substantially equal to or smaller than 60 degrees in terms of angle of rotation of the rotor, common windings mounted one round each of the stator magnetic poles, and a common-winding-current drive circuit, wherein said system has a common-winding-current drive circuit for obtaining an excitation current such as to excite the motor in accordance with an excitation command signal, for obtaining a torque current such as to have a magnitude in accordance with a torque command and to flow in the command winding of each stator salient pole, at which a counterclockwise end of the associated salient pole is located when the torque command is positive or a clockwise end of the associated salient pole is located when the torque command is negative, and for rendering a composite current, which is a sum of said excitation current and said torque current, to flow in each common winding.

4. A motor control system according to claim 3, wherein:

when the torque command is positive while the rotor is rotating counterclockwise, said torque current is controlled in the torque winding on each stator magnetic pole in such a manner that said torque current is increased while the counterclockwise end of each rotor salient pole is located counterclockwise of the clockwise end of the associated stator magnetic pole and that said torque current in the common winding on each stator magnetic pole is decreased while the clockwise end of the rotor salient pole is located counterclockwise of the counterclockwise end of the associated stator magnetic pole, and when the torque command is negative while the rotor is rotating counterclockwise, said torque current is controlled in the common winding on each stator magnetic pole in such a manner that said torque current is increased while each stator magnetic pole is located within a width of the associated rotor salient pole and that said torque current is decreased while none of the stator magnetic poles are located in confronting relationship with any of the rotor salient poles throughout their circumferential surfaces.

5. A motor control system according to claim 2, wherein:

when the torque command is positive while the rotor is rotating counterclockwise, said torque current is controlled in the common winding on each stator magnetic pole in such a manner that said torque current is increased while the counterclockwise end of each rotor salient pole is located counterclockwise of the clockwise end of the associated stator magnetic pole by a RA angle and that said torque current in the common winding on each stator magnetic pole is decreased while the clockwise end of the rotor salient pole is located counterclockwise of the counterclockwise end of the associated stator magnetic pole by said RA angle, when the torque command is negative while the rotor is rotating counterclockwise, said torque current is controlled in the common winding on each stator magnetic pole in such a manner that said torque current is increased while the clockwise end of each rotor salient pole is located clockwise of the clockwise end of the associated magnetic pole by said RA angle and that said torque current is decreased while the clockwise end of each rotor salient pole is located clockwise of the counterclockwise end of the associated stator magnetic pole by said RA angle, and wherein said RA angle is small when the rate of the rotation of the motor is small and is large when the rate of the rotation of the motor is large.

6. A motor control system according to claim 4, wherein:

when the torque command is positive while the rotor is rotating counterclockwise, said torque current is controlled in the common winding on each stator magnetic pole in such a manner that said torque current is increased while the counterclockwise end of each rotor salient pole is located counterclockwise of the clockwise end of the associated stator magnetic pole by a RA angle and that said torque current in the common winding on each stator magnetic pole is decreased while the clockwise end of the rotor salient pole is located counterclockwise of the counterclockwise end of the associated stator magnetic pole by said RA angle, when the torque command is negative while the rotator is rotating counterclockwise, said torque current is controlled in the common winding on each stator magnetic pole in such a manner that said torque current is increased while the clockwise end of each rotor salient pole is located clockwise of the clockwise end of the associated magnetic pole by said RA angle and that said torque current is decreased while the clockwise end of each rotor salient pole is located clockwise of the counterclockwise end of the associated stator magnetic pole by said RA angle, and wherein said RA angle is small when the rate of the rotation of the motor is small and is large when the rate of the rotation of the motor is large.

7. A motor control system according to claim 1, including a plurality of regenerative windings mounted one on each stator magnetic pole, and further comprising a plurality of diodes each connected in series between each of the regenerative windings and a power source of the motor for utilizing part of the magnetic energy of each stator magnetic pole to rotate the motor and supplying the other part of the magnetic energy back to the power source, each of said diodes having an anode connected to a low-voltage side of the power source and a cathode connected to a high-voltage side of the power source.

8. A motor control system according to claim 3, including a plurality of regenerative windings mounted one on each stator magnetic pole, and further comprising a plurality of diodes each connected in series between each of the regenerative windings and a power source of the motor for utilizing part of the magnetic energy of each stator magnetic pole to rotate the motor and supplying the other part of the magnetic energy back to the power source, each of said diodes having an anode connected to a low-voltage side of the power source and a cathode connected to a high-voltage side of the power source.

* * * * *